United States Patent
Laine et al.

(10) Patent No.: US 10,153,894 B2
(45) Date of Patent: Dec. 11, 2018

(54) HOMOMORPHIC ENCRYPTION WITH OPTIMIZED ENCODING

(71) Applicant: Microsoft Technology Licensing, LLC, Redmond, WA (US)

(72) Inventors: Kim Laine, San Mateo, CA (US); Nathan Dowlin, Chelsea, VT (US); Ran Gilad-Bachrach, Bellevue, WA (US); Michael Naehrig, Sammamish, WA (US); John Wernsing, Redmond, WA (US); Kristin E. Lauter, La Jolla, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 85 days.

(21) Appl. No.: 14/934,048

(22) Filed: Nov. 5, 2015

(65) Prior Publication Data

US 2017/0134157 A1    May 11, 2017

(51) Int. Cl.
   *H04L 9/00*    (2006.01)
   *G06F 7/483*   (2006.01)
   *G09C 1/00*    (2006.01)

(52) U.S. Cl.
   CPC .............. *H04L 9/008* (2013.01); *G06F 7/483* (2013.01); *G09C 1/00* (2013.01); *H04L 2209/125* (2013.01)

(58) Field of Classification Search
   CPC ..... H04L 9/008; H04L 2209/125; G09C 1/00; G06F 7/483
   See application file for complete search history.

(56) References Cited

U.S. PATENT DOCUMENTS

| | | |
|---|---|---|
| 8,515,058 B1 | 8/2013 | Gentry |
| 8,565,435 B2 | 10/2013 | Gentry et al. |
| 8,861,716 B2 | 10/2014 | Halevi et al. |

(Continued)

FOREIGN PATENT DOCUMENTS

| | | |
|---|---|---|
| CN | 103425933 A | 12/2013 |
| WO | WO2012158621 A1 | 11/2012 |

(Continued)

OTHER PUBLICATIONS

Bergh, Petter Andreas, "Ext-symmetry over quantum complete intersections", Archives of Mathematics, May 2009, 6 pages.

(Continued)

*Primary Examiner* — Jeffrey D. Popham
(74) *Attorney, Agent, or Firm* — Schwegman Lundberg & Woessner, P.A.

(57) ABSTRACT

The techniques and/or systems described herein are directed to improvements in homomorphic encryption to improve processing speed and storage requirements. For example, the techniques and/or systems can be used on a client device to encode data to be sent to a remote server, to be operated on while maintaining confidentiality of data. For example, data including a real number can be encoded as a polynomial, with the fractional part of the real number encoded as high-order coefficients in the polynomial. Further, real numbers can be approximated and encoded in a polynomial using a fractional base, and/or the encoding can include slot encoding. Thus, the optimized encodings disclosed herein provide an optimized homomorphic encryption scheme.

11 Claims, 10 Drawing Sheets

(56) References Cited

U.S. PATENT DOCUMENTS

| | | | |
|---|---|---|---|
| 8,925,075 | B2 | 12/2014 | Krendelev et al. |
| 8,958,555 | B2 | 2/2015 | Gentry et al. |
| 8,972,742 | B2 | 3/2015 | Troncoso Pastoriza et al. |
| 9,083,526 | B2 | 7/2015 | Gentry |
| 2004/0078407 | A1 | 4/2004 | Naslund et al. |
| 2004/0086113 | A1 | 5/2004 | Lauter et al. |
| 2004/0143403 | A1 | 7/2004 | Brandon et al. |
| 2011/0110525 | A1 | 5/2011 | Gentry |
| 2012/0039463 | A1* | 2/2012 | Gentry ............... H04L 9/008 380/28 |
| 2012/0201378 | A1 | 8/2012 | Nabeel et al. |
| 2013/0097417 | A1 | 4/2013 | Lauter et al. |
| 2013/0150253 | A1 | 6/2013 | Deciu et al. |
| 2013/0170640 | A1 | 7/2013 | Gentry |
| 2013/0216044 | A1* | 8/2013 | Gentry ............... H04L 9/008 380/277 |
| 2013/0329883 | A1 | 12/2013 | Tamayo-rios |
| 2014/0177828 | A1 | 6/2014 | Loftus et al. |
| 2014/0372769 | A1 | 12/2014 | Kerschbaum et al. |
| 2015/0039912 | A1 | 2/2015 | Payton et al. |
| 2015/0154406 | A1 | 6/2015 | Naehrig et al. |
| 2015/0213079 | A1 | 7/2015 | Shukla et al. |
| 2016/0110500 | A1 | 4/2016 | Wang et al. |
| 2016/0119119 | A1* | 4/2016 | Calapodescu ........... H04L 9/30 380/30 |
| 2016/0182226 | A1* | 6/2016 | Yasuda ............... H04L 9/0819 380/28 |
| 2016/0352510 | A1* | 12/2016 | Morikawa ............. H04L 9/008 |
| 2016/0352710 | A1 | 12/2016 | Hibshoosh et al. |
| 2017/0180115 | A1 | 6/2017 | Laine et al. |

FOREIGN PATENT DOCUMENTS

| | | |
|---|---|---|
| WO | WO2013067542 A1 | 5/2013 |
| WO | WO2015112859 A1 | 7/2015 |

OTHER PUBLICATIONS

Betley, et al., "The cyclotomic trace and curves on K-theory", Topology, Pergamon, Jul. 2005, 30 pages.

Bos et al., "Leveled Homomorphic Encryption with Smaller Ciphertexts", unknown publication date, 18 pages.

Boyar et al., "A depth-16 circuit for the AES S-box", National Institute of Standards and Technology, Dec. 2011, 11 pages.

Brakerski et al., "Fully Homomorphic Encryption from Ring-LWE and Security for Key Dependent Messages", Proceedings of the 31st annual conference on Advances in cryptology, Aug. 2011, 20 pages.

Brakerski, Zvika, "Fully Homomorphic Encryption without Modulus Switching from Classical GapSVP", Stanford University, CRYPTO 2012, Aug. 2012, 20 pages.

Brakerski et al., "Fully Homomorphic Encryption without Bootstrapping", Association for Computing Machinery, Jan. 2008, 27 pages.

Cetin et al, "An Investigation of Complex Operations with Word-Size Homomorphic Encryption", Dec. 2015, Cryptology ePrint Archive, Report 2015/1195, 16 pgs.

Duan et al., "Practical Private Computation and Zero-Knowledge Tools for Privacy-Preserving Distributed Data Mining", Proc 2008 SIAM Intl Conf on Data Mining, Apr. 2008, 12 pages.

Gentry et al., "Homomorphic Evaluation of the AES Circuit", International Association for Cryptologic Research, Jun. 15, 2012, 34 pages.

Gentry et al., "Better Bootstrapping in Fully Homomorphic Encryption", Public Key Cryptography, Dec. 15, 2011, 22 pages.

Gentry et ai.,"Fully Homomorphic Encryption with Polylog Overhead", International Association for Cryptologic Research, Oct. 2011, 40 pages.

Graepel et al., "ML Confidential: Machine Learning on Encrypted Data", Proc 15th intl conf on Information Security and Cryptology, Sep. 2012, 10 pages.

International Search Report and Written Opinion received for PCT Patent Application No. PCT/US2013/077348, dated Jun. 30, 2014, 18 pages.

Oracle, "Platform-as-a-Service Private Cloud with Oracle Fusion Middleware", An Oracle White Paper, Oct. 2009, 20 pages (Author unknown).

Qin et al., "An FPGA Design of AES Encryption Circuit with 128-bit Keys", GLSVLSI'05, Apr. 2005, 5 pages.

Ramaekers, Coen, "Fully Homomorphic Encryption in JCrypTool", Aug. 4, 2011, 85 pages.

Smart et al., "Fully Homomorphic SIMD Operations", Designs, Codes and Cryptography, Apr. 2014, vol. 71, Issue 1, 19 pages.

Stehle et al., "Making NTRU as Secure as Worst-Case Problems over Ideal Lattices", Advances in Cryptology, EUROCRYPT 2011, May 2011, 21 pages.

Ayday, et al., "Personal use of the genomic data: Privacy vs. storage cost", In Proceedings of IEEE Global Communications Conference, Dec. 9, 2013, pp. 2723-2729.

Ayday et al, "Privacy Enhancing Technologies for Medical Tests Using Genomic Data", 20th Network and Distribution System Security Symposium, Feb. 2013, 3 pgs.

Ayday, et al., "Privacy-Preserving Computation of Disease Risk by Using Genomic, Clinical, and Environmental Data", In Proceedings of the USENIX conference on Safety, Security, Privacy and Interoperability of Health Information Technologies, Aug. 12, 2013, 10 pages.

Boneh et al, "Private Database Queries Using Somewhat Homomorphic Encryption", Applied Cryptography and Network Security, Jun. 2013, 21 pgs.

Bos, et al., "Improved Security for a Ring-Based Fully Homomorphic Encryption Scheme", In Proceedings of 14th IMA International Conference on Cryptography and Coding, Dec. 17, 2013, 30 pages.

Bosma, et al., "The Magma Algebra System I: The User Language", In Journal of Symbolic Computation, vol. 24, Issue 3-4, Sep. 1997, pp. 235-265.

Brakerski, et al., "(Leveled) Fully Homomorphic Encryption without Bootstrapping", In Proceedings of 3rd Innovations in Theoretical Computer Science Conference, Jan. 8, 2012, pp. 309-325.

Brakerski, et al., "Classical Hardness of Learning with Errors", In Proceedings of Forty-Fifth Annual ACM Symposium on Theory of Computing, Jun. 1, 2013, pp. 575-584.

Brakerski, et al., "Efficient Fully Homomorphic Encryption from (Standard) LWE", In Proceedings of IEEE 52nd Annual Symposium on Foundations of Computer Science, Oct. 22, 2011, pp. 97-106.

Brakerski, et al., "Lattice-based FHE as Secure as PKE", In Proceedings of 5th Conference on Innovations in Theoretical Computer Science, Jan. 12, 2014, pp. 1-12.

Brakerski, et al., "Packed Ciphertexts in LWE-Based Homomorphic Encryption", In Proceedings of 16th International Conference on Practice and Theory in Public-Key Cryptography, Sep. 2012, pp. 1-12.

Cheon, et al., "Homomorphic Computation of Edit Distance", In Proceedings of 3rd Workshop on Encrypted Computing and Applied Homomorphic Cryptography, Jan. 30, 2015, pp. 1-16.

Clarke et al, "Basic Statistical Anaylsis in Genetic Case Control Studies", Nat Protoc, vol. 6, Feb. 2011, 28 pgs.

Dijk, et al., "Fully homomorphic encryption over the integers", In Proceedings of 29th Annual International Conference on the Theory and Applications of Cryptographic Techniques, May 30, 2010, 21 pages.

Dowlin, et al., "Manual for Using Homomorphic Encryption for Bioinformatics", In TechReport MSR-TR-2015-87, Nov. 13, 2015, pp. 1-16.

Eisenbud, David., "Commutative Algebra: with a view toward algebraic geometry", Book, Chapt 2, 2.6 Exercises, pp. 79-86, Mar. 30, 1995.

Festa, et al., "Nuclear Magnetic Resonance Lipoprotein Abnormalities in Prediabetic Subjects in the Insulin Resistance Atherosclerosis Study", In Journal of Circulation, vol. 111, Issue 25, Jun. 28, 2005, pp. 3465-3472.

Furihata et al, "Test of Association Between Haplotypes andPhenotypes in Case Control Studies: Examination of Validity of the Application

(56) References Cited

OTHER PUBLICATIONS of an Algorithm for Samples from Cohort or Clinicial trials to Case Control Samples Using Simulated and Real Data", Genetics, vol. 174, Issue 3, Nov. 2006, 12 pgs.
Gentry, "A Fully Homomorphic Encryption Scheme", Sep. 2009 Dissertation, 209 pgs.
Gentry, Craig, "Fully Homomorphic Encryption Using Ideal Lattices", In Proceedings of Forty-First Annual ACM Symposium on Theory of Computing, May 31, 2009, pp. 169-178.
Gentry, et al., "Homomorphic Encryption from Learning with Errors: Conceptually-Simpler, Asymptotically-Faster, Attribute-Based", In Proceedings of 33rd Annual Cryptology Conference on Advances in Cryptology, vol. 8042, Jun. 8, 2013, pp. 1-25.
Gentry, et al., "Homomorphic Evaluation of the Aes Circuit", In Proceedings of 32nd Annual Cryptology Conference, Jan. 3, 2015, 35 pages.
PCT Intl Search Report and Written Opinion for PCT/US2014/066992, dated Mar. 10, 2015, 12 pages.
Kim, et al., "Private Genome Analysis through Homomorphic Encryption", In Journal of BMC medical informatics and decision making, vol. 15, Dec. 2015, pp. 1-18.
Lauter et al,, "Private Computation on Encrypted Genomic Data", Proc Privacy Enhancing Technologies Symposium, Workshop on Genome Privacy, Jul. 2014, 21 pgs.
Lepoint et al., "A Comparison of the Homomorphic Encryption Schemes FV and YASHE", In Proceedings of 7th International Conference on Cryptology in Africa, May 28, 2014, pp. 1-18.
Lindner, et al., "Better Key Sizes (and Attacks) for LWE-Based Encryption", In Proceedings of the 11th international conference on Topics in cryptology, Nov. 30, 2010, pp. 1-21.
Lopez-Alt, et al., "On-the-Fly Multiparty Computation on the Cloud via Multikey Fully Homomorphic Encryption", In Proceedings of the fortyfourth annual ACM symposium on Theory of computing, May 19, 2012, pp. 1219-1234.
Lyubashevsky, et al., "On Ideal Lattices and Learning with Errors over Rings", In Journal of the ACM, vol. 60, Issue 6, Nov. 2013, 35 pages.
McLaren, et al., "Privacy-preserving genomic testing in the clinic: a model using HIV treatment", In Journal of Genetics in Medicine, Jan. 14, 2016, pp. 1-9.
Micciancio, et al., "Trapdoors for Lattices: Simpler, Tighter, Faster, Smaller", In Proceedings of 31st Annual International Conference on the Theory and Applications of Cryptographic Techniques, Apr. 15, 2012, 18 pages.
Peikert, Chris, "Public-key cryptosystems from the worst-case shortest vector problem", In Proceedings of the forty-first annual ACM symposium on Theory of computing, May 31, 2009, pp. 333-342.
Pol, et al., "Estimating key sizes for high dimensional lattice-based systems", In Proceedings of 14th IMA International Conference on Cryptography and Coding, Dec. 17, 2013, pp. 1-11.
"R: A Language and Environment for Statistical Computing", In Publication of R Foundation for Statistical Computing, Nov. 30, 2009, 3503 pages.
Regev, Oded, "On lattices, learning with errors, random linear codes, and cryptography", In Journal of the ACM, vol. 56, Issue 6, Sep. 2009, 40 pages.
Stehle et al., "Faster Fully Homomorphic Encryption", Chapt, Advances in Cryptology, ASIACRYPT 2010, vol. 6477 of series Lecture Notes in Computer Science, Sep. 2010, 25 pgs.
Tabaei, et al., "A multivariate logistic regression equation to screen for diabetes development and validation", In Journal of Diabetes Care, vol. 25, No. 11, Nov. 2002, pp. 1999-2003.
Torres, et al., "Effectiveness of Fully Homomorphic Encryption to Preserve the Privacy of Biometric Data", In Proceedings of the 16th International Conference on Information Integration and Web-based Applications & Services, Dec. 4, 2014, 7 pages.
Wang, et al., "Efficient Genome-Wide, Privacy-Preserving Similar Patient Query based on Private Edit Distance", In Proceedings of the 22nd ACM SIGSAC Conference on Computer and Communications Security, Oct. 12, 2015, 12 pages.
Wang, et al., "HEALER: Homomorphic computation of exact logistic regression for secure rare disease variants analysis in GWAS", In Journal of Bioinformatics, vol. 32, Issue 2, Oct. 6, 2015, 8 pages.
Yasuda et al, "Secure Pattern Matching using Somewhat Homomorphic Encryption", Proc ACM Workshop on Cloud Computing Security, Nov. 2013, 12 pgs.
Zhang, et al., "FORESEE: Fully Outsourced secuRe gEnome Study basEd on homomorphic Encryption", In Journal of BMC Medical Informatics and Decision Making, vol. 15, Dec. 21, 2015, pp. 1-14.
"International Search Report and Written Opinion Issued in PCT Application No. PCT/US2016/060027", dated Feb. 22, 2017, 12 Pages.
Halevi, et al., "Design and Implementation of a Homomorphic-Encryption Library Contents", In IBM Research (Manuscript), Nov. 30, 2012, 42 Pages.
Brakerski, et al., "(Leveled) Fully Homomorphic Encryption without Bootstrapping", ACM Transactions on Computation Theory, vol. 6, No. 3, Article 13, Jul. 2014, 36 pgs.
Office action for U.S. Appl. No. 14/934,039, dated Feb, 27, 2017, Laine et al., "Homomorphic Encryption with Optimized Parameter Selection",17 pages.
Okamoto, et al, "Homomorphic Encryption and Signatures from Vector Decomposition", Sep. 2008, Proc 2nd Intl Conf on Pairing Based Cryptography, Retrived from the Internet, <<http://link.springer.com/chapter/10.1007/978-3-540-85538-5_4>>, pp #unnumbered—pp. 58-74.
International Search Report and Written Opinion received for PCT Patent Application No. PCT/US2016/060038, dated Feb. 23, 2017, 12 pages.
Ayday et al, "Privacy Preserving Computation of Disease Risk by Using Genomic, Clinical, and Environmental Data", USENIX Security Workshop on Health Information Technologies, Aug. 2013, 10 pgs.
Basilakis, et al., "The Potential for Machine Learning Analysis over Encrypted Data in Cloud-based Clinical Decision Support—Background and Review", Proceedings of the 8th Australasian Workshop on Health Informatics and Knowledge Management, Jan. 27, 2015, pp. 3-13.
Bos, et al., "Private Predictive Analysis on Encrypted Medical Data", In Journal of Biomedical Informatics, May 2015, 20 pages.
Domingo-Ferrer, et al., "Privacy Homomorphisms for Social Networks With Private Relationships", In Proceedings of the International Journal of Computer and Telecommunications Networking, Jul. 28, 2008, pp. 1-10.
Doroz, et al., "Accelerating Fully Homomorphic Encryption in Hardware", Published on: Sep. 2013, Available at: http://ecewp.ece.wpi.edu/wordpress/vernam/files/2013/09/Accelerating-Fully-Homomorphic-Encryption-in-Hardware.pdf, 14 pgs.
Fan, et al., "Somewhat Practical Fully Homomorphic Encryption", In Journal of IACR Cryptology ePrint Archive, May 7, 2012, 19 pages.
Hu, et al., "Improving the Efficiency of Homomorphic Encryption Schemes", In Thesis of Electrical and Computer Engineering, May 2013, 103 pages.
Lauter et al, "Can Homomorphic Encryption be Practical?", Proc 3rd ACM workshop on Cloud Computing Security Workshop, Oct. 2011, 12 pgs.
Lopez-Alt et al, "On the Fly Multiparty Computation on the Cloud via Multikey Fully Homomorphic Encryption" Proc 44th ACM Symposium on Theory of Computing, May 2012, 73 pgs.
Wang, et al., "Accelerating Fully Homomorphic Encryption Using GPU", In Proceedings of IEEE Conference on High Performance Extreme Computing, Sep. 10, 2012, 5 pages.
Wang, et al., "Exploring the Feasibility of Fully Homomorphic Encryption", Published on: Dec. 2012, Available at: http://ecewp.ece.wpi.edu/wordpress/crypto/files/2012/12/journal0705.pdf, 8 pgs.
Xie, et al., "Crypto-Nets: Neural Networks Over Encrypted Data", In Proceedings of 3rd International Conference on Learning Representations, May 7, 2015, pp. 1-9.

(56) References Cited

OTHER PUBLICATIONS

"Final Office Action Issued in U.S. Appl. No. 14/934,039", dated Jun. 15, 2017, 21 Pages.
"Second Written Opinion Issued in PCT Application No. PCT/US2016/060038", dated Sep. 28, 2017, 9 Pages.
"Non Final Office Action Issued in U.S. Appl. No. 14/975,528", dated Jul. 7, 2017, 12 Pages.
"International Preliminary Report on Patentability issued in PCT Application No. PCT/US2016/060038", dated Feb. 14, 2018, 11 Pages.

* cited by examiner

HOMOMORPHIC ENCRYPTION WITH OPTIMIZED ENCODING

BACKGROUND

The development of cloud storage and services has allowed users to offload and/or outsource both storage of their data and associated computations on that data. As a result, businesses can choose to forego the expensive proposition of maintaining their own data centers, relying instead on cloud storage and computational services. In addition to storing data in remote servers, computations can be performed in remote servers as well.

Maintaining data confidentiality is an especially important concern for storing data and performing computations on data in remote servers. Encryption schemes represent one form of technology directed towards securing data when stored in memory, when operated on, and/or transmitted over networks.

SUMMARY

The techniques and/or systems described herein are directed to improvements in homomorphic encryption to improve processing speed and storage requirements. For example, the techniques and/or systems can be used on a client device to encode and/or encrypt data to be sent to a remote server, to be operated on while maintaining confidentiality of data. The encoding and/or encrypting scheme can be optimized by automatically selecting one or more parameters using an error growth simulator based on an actual program that operates on the encoded and/or encrypted data, thereby improving practicality and ease-of-use.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

Figure 1:
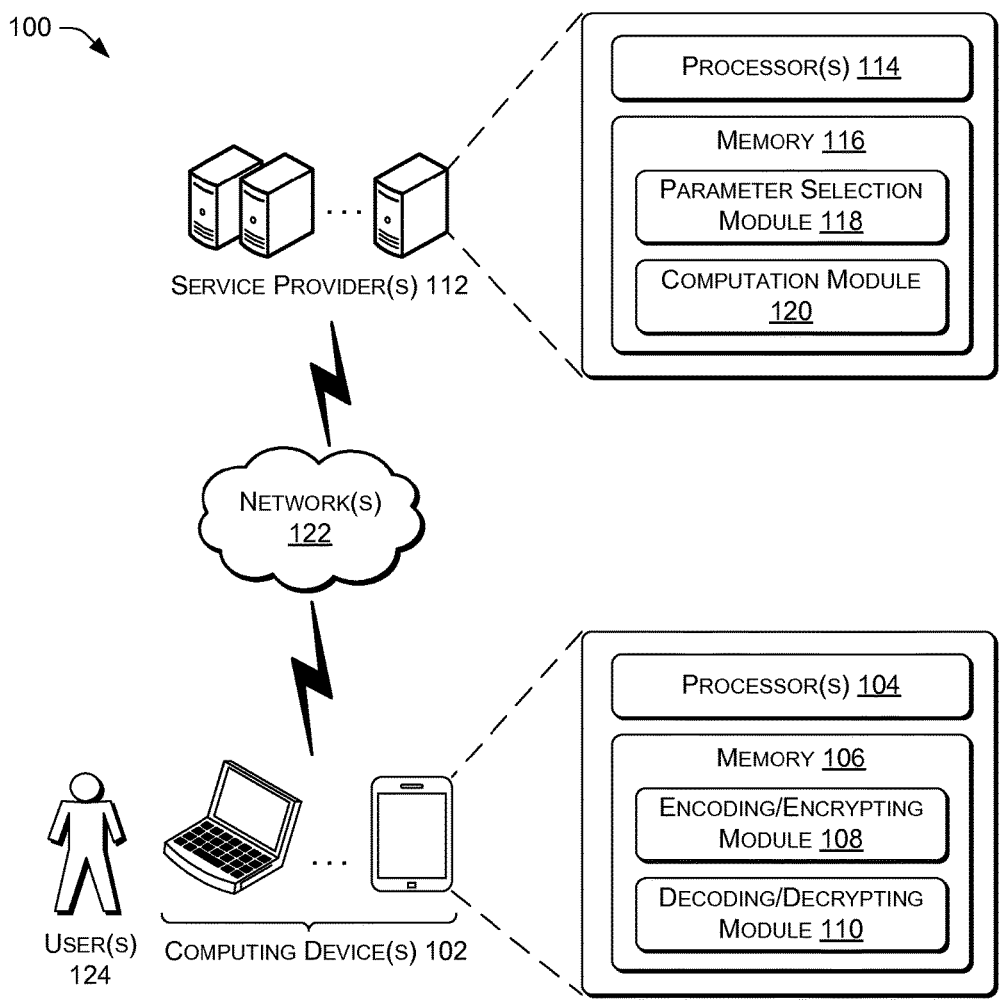
FIG. 1 illustrates an example environment for managing secure computations on encrypted data.

The techniques and/or systems described herein provide homomorphic encryption with optimized encodings and parameter selection. The optimized encodings and parameter selection can be provided by encoding a fractional part of real numbers in high order coefficients, by encoding a number using a small fractional base to get efficient approximate arithmetic, by encoding numbers in balanced odd base b, with each base-b term encoded as a coefficient of a plaintext polynomial, by using slot encoding to manage coefficient growth in homomorphic operations, and/or by providing automatic parameter selection using an error growth simulator. The techniques and/or systems described herein may be used in fully homomorphic encryption, partial homomorphic encryption, and practical homomorphic encryption.

Fully Homomorphic Encryption (FHE) refers to an encryption scheme that allows an untrusted server to execute arbitrary computation on encrypted data on behalf of a computing device often referred to as a client. Solutions for constructing an FHE scheme can incur significant costs due to a reliance on certain mathematical concepts (e.g., ideal lattices) to evaluate any function on encrypted data. In practice, these constructions can be improved using techniques, such as those related to batch-wise or bit-wise encryption, but often remain unworkable for a number of reasons, for example, necessitating deep circuits, such as those based on symmetric encryption standards, and/or substantial storage space to process ciphertexts. While some FHE constructions are capable of computing block ciphers homomorphically, evaluating a single block using these constructions can be several orders of magnitude slower in terms of throughput and latency when compared to evaluating a single block non-homomorphically.

The techniques and/or systems described herein can improve a functioning of a computing device by reducing an amount of processing and/or by reducing an amount of memory required for performing computations on encrypted data. For example, the encoding techniques discussed herein can reduce a number of scaling factors and the computational overhead of tracking and applying the scaling factors throughout computations. Further, the encoding techniques can improve processing by obviating a need to perform any "bootstrapping" operations, which otherwise would be a huge computational burden to reformulate data during computations to remove noise. The techniques and/or systems discussed herein can improve the functioning of a computer and/or a network by improving the security of the data transmitted, operated on, and stored in a network. For example, the techniques described herein can allow encrypted data to be transmitted, operated on, and a result can be obtained, all without requiring the data to be decrypted or decoded on a remote server, thereby ensuring a confidentiality of the data. Further, the techniques and/or systems described herein allow clients to outsource computations to a network computer when a client does not have all the data required to run an algorithm.

Also, the techniques and/or systems discussed herein improve the functioning of machine learning algorithms because the confidentiality afforded by using homomorphic encryption encourages more users to use algorithms, which in turn, allows algorithms to operate on wider data sets, thereby improving the accuracy of various prediction algorithms. Relative to non-optimized homomorphic encrypting using bitwise encryption, the encoding techniques discussed herein can decrease the size of data that needs to be transmitted over a network, thereby reducing congestion in a network, and further reducing an amount of processing required by components of the network. The optimization techniques and/or systems discussed herein further generate parameters which improves the functioning of a computing device by providing optimized parameters to reduce processing time and memory requirements.

Various examples for implementing homomorphic encryption using optimized encoding and parameter selection are described herein with reference to FIGS. 1-10.

FIG. 1 illustrates an example environment 100 that is usable to implement the techniques and/or systems associated with the homomorphic encryption scheme described herein. The environment 100 includes computing device(s) 102 having processor(s) 104 and a memory 106 including an encoding/encrypting module 108 and a decoding/decrypting module 110. In various embodiments, the encoding/encrypting module 108 can include one or more programs or hardware that operates to encode and/or encrypt data in a scheme for secure remote computation. The environment 100 also includes service provider(s) 112 to provide one or more services to the computing device 102, such as the secure remote computing. To that end, the service provider 112 can include processor(s) 114 and a memory 116 including a parameter selection module 118 and a computation module 120 provide the secure remote computing, which is explained in connection with the figures provided in this disclosure.

The computing device 102 can include, but is not limited to, any one of a variety of computing devices, such as a smart phone, a mobile phone, a personal digital assistant (PDA), an electronic book device, a laptop computer, a desktop computer, a tablet computer, a portable computer, a gaming device, a personal media player device, a server computer, a wearable device, or any other electronic device.

As introduced above, the computing device 102 can include one or more processor(s) 104 and memory 106. The processor(s) 104 can be a single processing unit or a number of units, each of which could include multiple different processing units. The processor(s) 104 can include one or more microprocessors, microcomputers, microcontrollers, digital signal processors, central processing units (CPUs), graphics processing units (GPUs), security processors (e.g., secure cryptoprocessors), and/or other processors. Alternatively, or in addition, some or all of the techniques described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), state machines, Complex Programmable Logic Devices (CPLDs), other logic circuitry, systems on chips (SoCs), and/or any other devices that perform operations based on software and/or hardware coded instructions. Among other capabilities, the processor(s) 104 can be configured to fetch and/or execute computer-readable instructions stored in the memory 106.

The memory 106 can include one or a combination of computer-readable media. As used herein, "computer-readable media" includes computer storage media and communication media.

Computer storage media includes volatile and non-volatile, removable and non-removable media implemented in any method or technology for storage of information, such as computer-readable instructions, data structures, program modules, or other data. Computer storage media includes, but is not limited to, Phase Change Memory (PCM), Static Random-Access Memory (SRAM), Dynamic Random-Access Memory (DRAM), other types of Random-Access Memory (RAM), Read-Only Memory (ROM), Electrically Erasable Programmable ROM (EEPROM), flash memory or other memory technology, Compact Disc ROM (CD-ROM), Digital Versatile Discs (DVD) or other optical storage, magnetic cassettes, magnetic tape, magnetic disk storage or other magnetic storage devices, or any other medium that can be used to store information for access by a computing device.

In contrast, communication media includes computer-readable instructions, data structures, program modules, or other data in a modulated data signal, such as a carrier wave. As defined herein, computer storage media does not include communication media.

In various embodiments, the computing device 102 can communicate with the service provider 112 via one or more wired or wireless networks 122, such as the Internet, a Mobile Telephone Network (MTN), or other various communication technologies.

In various embodiments, the memory 106 can include an operating system configured to manage hardware and services within and coupled to the computing device 102 for the benefit of other components and other devices.

The encoding/encrypting module 108 and the decoding/decrypting module 110 can include hardware and/or software components. For example, the encoding/encrypting module 108 and/or the decoding/decrypting module 110 can be implemented by one or more modules stored in the memory 106 and/or by one or more components of the processor(s) 104. As used herein, the term "module" is intended to represent example divisions of software and/or firmware for purposes of discussion, and is not intended to represent any type of requirement or required method, manner or organization. Accordingly, while various "modules" are discussed, their functionality and/or similar functionality could be arranged differently (e.g., combined into a fewer number of modules, broken into a larger number of modules, etc.). Further, while certain functions are described herein as being implemented as software modules configured for execution by a processor, in other embodiments, any or all of the functions can be implemented (e.g., performed) in whole or in part by hardware logic components, such as FPGAs, ASICs, ASSPs, state machines, CPLDs, other logic circuitry, SoCs, and so on.

The encoding/encrypting module 108 can perform operations to encode and/or encrypt data in accordance with embodiments of the disclosure. For example, the encoding/encrypting module 108 can utilize parameters generated by the service provider 112 to encode data using the techniques disclosed herein. Further, the encoding/encrypting module 108 can generate a public key based at least in part on the parameters generated by the service provider 112 to encrypt the encoded data.

The decoding/decrypting module 110 can perform operations to decrypt and/or decode data in accordance with embodiments of the disclosure. For example, the decoding/decrypting module 110 can utilize parameters generated by the service provider 112 to generate a secret key for decrypting the encrypted data. Further, the decoding/decrypting module 110 can decode the decrypted data to obtain a plaintext result.

The service provider 112 can include one or more computing devices, such as one or more desktop computers, laptop computers, servers, and the like. The one or more computing devices can be configured in a cluster, data center, cloud computing environment, or a combination thereof. In one example, the one or more computing devices provide cloud computing resources, including computational resources, storage resources, and the like, that operate remotely from the computing device 102.

The one or more computing devices of the service provider 112 can include one or more processor(s) 114 and memory 116. The one or more processor(s) 114 can comprise a single processing unit or a number of units, each of which could include multiple different processing units. The one or more processor(s) 114 can include, for example, one or more microprocessors, microcomputers, microcontrollers, digital signal processors, CPUs, GPUs, security processors (e.g., secure cryptoprocessors), etc.

The memory 116 can include a parameter selection module 118 for automatically selecting parameters using an error growth simulator. For example, the parameter selection module 118 can receive a program, sequence, or series of operations from the computing device 102, for example, to perform on homomorphically encrypted data. As described below in connection with FIGS. 2 and 8-10, the parameter selection module 118 can operate a program to determine operating parameters such as a plaintext modulus T, a length N of a polynomial, a modulus Q, a standard deviation of error 6, a decomposition bit count W, a base B for encoding integers or real numbers into plaintext polynomials, a desired security level, an allowable error level, and the like. After parameters are generated and/or selected by the parameter selection module 118, the parameters can be transmitted to the computing device 102, to be used by the encoding/encrypting module 108 and/or by the decoding/decrypting module 110.

The memory 116 can also include a computation module 120 to perform computations on encoded data received from the computing device 102. For example, the computation module 120 can be a program such as a machine learning program, a prediction engine, an image analysis program, a financial program, or any other program that performs calculations on encrypted data. For example, the computation module 120 can include a tax preparation program, and can receive tax and financial data encoded by the encoding/encrypting module 108. In another example, the computation module 120 can include a genomic data analysis program to perform predictive analysis on genomic data encoded and/or encrypted by the encoding/encrypting module 108. As can be understood in the context of this disclosure, the computation module 120 can include any program, computation, or operation that can be performed on data. In various embodiments, the computation module 120 can perform computations on the received encoded and/or encrypted data and can generate an encoded and/or encrypted result, which can be transmitted to the computing device 102 for decryption and/or decoding by the decoding/decrypting module 110.

The environment 100 also includes one or more users 124 to employ the computing device 102. The one or more users 124 can interact with the computing device 102 to perform a variety of operations.

The example processes (e.g., in FIGS. 2-7, 9, and 10) are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, configure a device to perform the recited operations. Generally, computer-executable instructions include routines, programs, objects, components, data structures, and the like that perform particular functions. The order in which the operations are described is not intended to be construed as a limitation, and any number of the described operations can be combined in any order and/or in parallel to implement the process. Further, any of the individual operations can be omitted.

Figure 2:
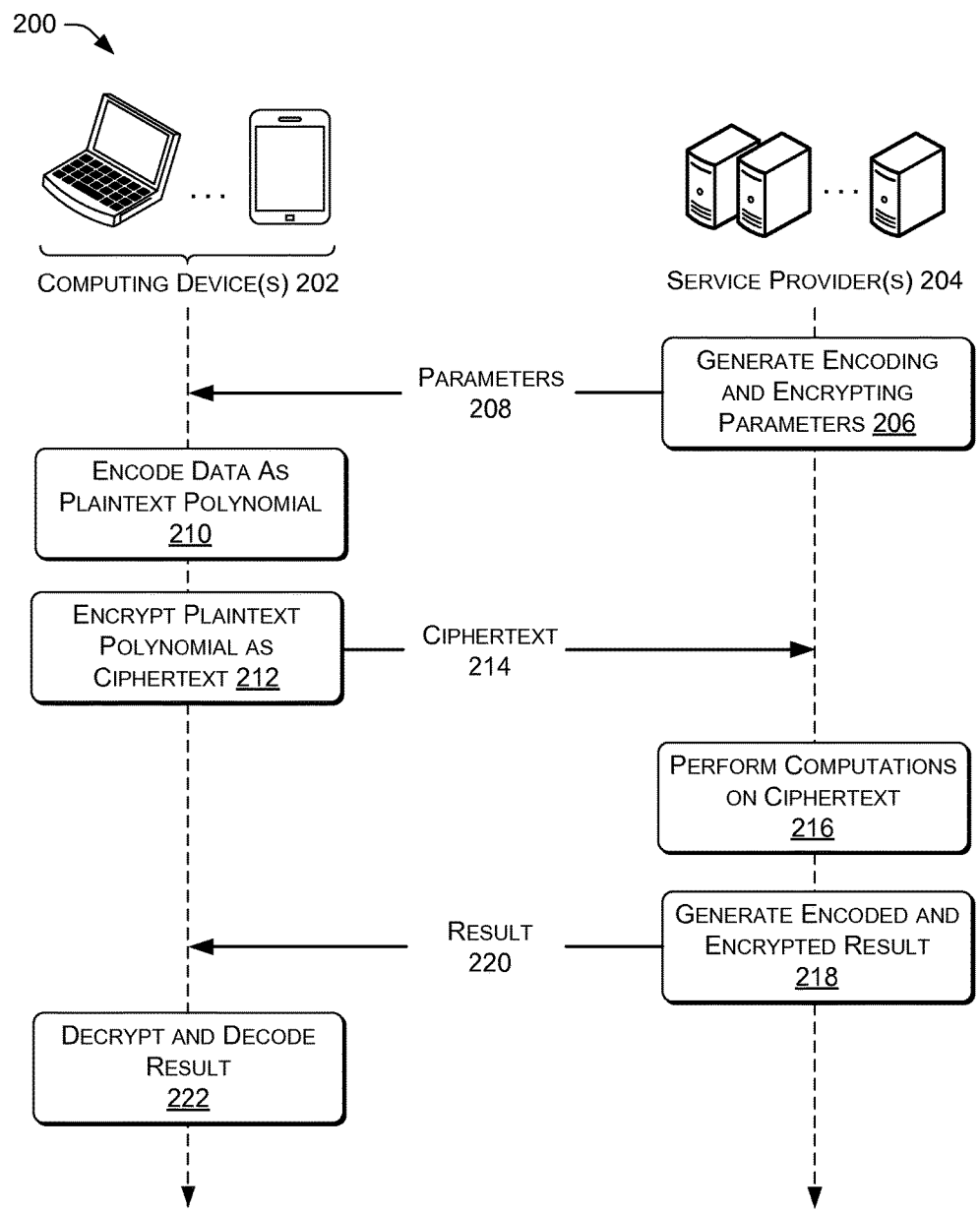
FIG. 2 illustrates an example process for managing secure computations on encrypted data.

FIG. 2 illustrates an example process 200 for managing secure computations on encrypted data, according to one example implementation. By way of example, the process 200 can be performed by and between computing device(s) 202 and service provider(s) 204, which can correspond to the computing device 102 and the service provider 112 in FIG. 1.

At 206, the service provider 204 can generate encoding and/or encrypting parameters using the parameter selection module 118, for example, of FIG. 1. In some embodiments, the service provider 204 generates the encoding and encrypting parameters in response to a request from the computing device 102. By way of example, the encoding and encrypting parameters can include, but are not limited to, a plaintext modulus T, a length N of a polynomial, a modulus Q, a standard deviation of error σ, a decomposition bit count W, a base B, a desired security level, an allowable error level, whether to use slot encoding, etc. Further details of generating the encoding and encrypting parameters are provided below in connection with FIGS. 8-10.

At 208, the encoding and encrypting parameters can be transmitted to the computing device 202. In some embodiments, the parameters 208 can be encrypted using a public key associated with the computing device 202, to further ensure the security of the data processing.

The computing device 202 can receive the parameters 208, and at 210 can use the encoding parameters to encode data as a plaintext polynomial. Further details of encoding data as a plaintext polynomial are discussed in connection with FIGS. 3-7, for example.

At 212, the data encoded in operation 210 is encrypted as a ciphertext, based at least in part on the parameters generated by the service provider 204. Because the data is encoded and encrypted by the computing device 202, the security and confidentiality of the data is preserved. In some embodiments, the operation 212 can include generating a public key for encrypting the encoded data, and a private key for decrypting the encrypted data. As can be understood in the context of this disclosure, the public and private keys can be generated at least in part based on the encoding and encrypting parameters generated in by the service provider 204 in operation 206.

At 214, the ciphertext is transmitted to the service provider 204. After the ciphertext is received by the service provider 204, at operation 216, computations can be performed on the ciphertext. As can be understood in the context of this disclosure, computations to be performed on the ciphertext can be determined by a program running on the service provider 204, and can include, but is not limited to, an image analysis process, a genomic analysis algorithm, a prediction algorithm, financial transactions, etc. Further, because of the process of encoding and encrypting the data, the computations can be performed on the data without decoding or decrypting the data. That is to say, homomorphic operations applied to the encoded and encrypted data can correspond to operations performed on the underlying data, without revealing any information about the contents of the data to the service provider 204. In some embodiments, computations can include addition, subtraction, multiplication, and/or division.

At 218, an encoded and encrypted result is generated by the service provider 204. As discussed above, a result can be generated without decoding or decrypting the data, which therefore ensures the confidentiality of the data and the result of the operations. For example, if a prediction algorithm performs operations on encoded and encrypted data, the service provider 204 learns nothing about the prediction, other than the fact that operations were performed, which can correspond to a prediction.

At 220, an encoded and encrypted result is returned to the computing device 202, after which, the computing device 202 can use an associated secret key to decrypt and decode the result to obtain a plaintext result. In some embodiments, the secret key (and the public key, discussed above) can be based at least in part on the encoding and/or encrypting parameters received from the service provider 204, resulting in optimized homomorphic encryption. As may be understood in the context of this disclosure, a plurality of users may encrypt data using the public key, and contribute the data to a computation performed on the service provider 204, but only one user may have the secret key to decrypt any result from the service provider 204. In this manner, optimized computations can be performed remotely without revealing any information about a user's data.

Figure 3:
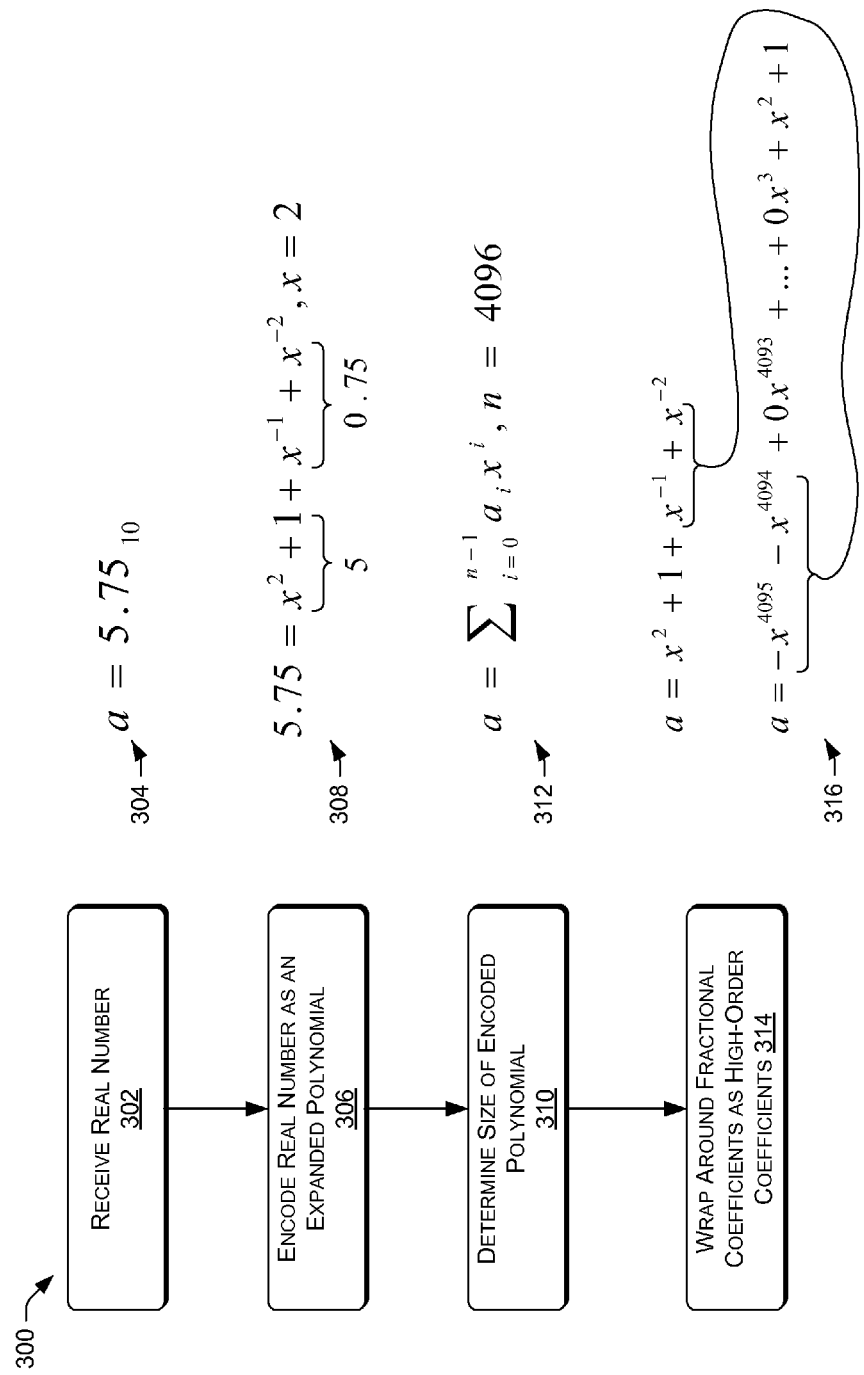
FIG. 3 illustrates an example process for encoding fractional parts of real numbers.

FIG. 3 illustrates another example process 300 for encoding fractional parts of real numbers, according to one example implementation. In one embodiment, the process 300 can be performed by the encoding/encrypting module 108 in the computing device 102 of FIG. 1. However, processes can be performed in other environments and by other devices as well.

In general, the process 300 includes receiving data (as a real number) in operation 302, which is encoded as a polynomial in a message space of a homomorphic encryption scheme. This process is performed by the computing device (such as the computing device 102) on data to generate encoded data, which can be encrypted and transmitted to a service provider (such as the service provider 112), for computation. An encoded and/or encrypted result is generated by the computation module 120 without decrypting or decoding the data, and an encrypted and/or encoded result is returned to the computing device 102.

One advantage of the process 300 is that it can operate directly on real numbers (e.g., example 304, where $a=5.75_{10}$, indicating that the number 5.75 is written in base 10), instead of having to scale a real number (e.g., by multiplying by 10) such that the real number is converted to an integer. As the process 300 avoids this scaling, the process 300 reduces processing time and memory requirements, by not tracking a scaling factor associated with each piece of encoded data during computation in the homomorphic encryption scheme. Thus, process 300 improves the functioning of the computer by reducing processing and memory requirements while encoding, encrypting, performing computations, and while decrypting and/or decoding an encoded result.

At 306, the process 300 encodes the real number as an expanded polynomial. For example, in the example 308, the number 5.75 can be expressed in a binary expansion as $5.75=x^2+1+x^{-1}+x^{-2}$, which when evaluated at $x=2$, give a result of 5.75.

At 310, the process 300 determines a size of an encoded polynomial. For example, this operation 310 can include receiving an encoding parameter determined by the parameter selection module 118. In some embodiments, the size of the encoded polynomial is determined by considering various factors, such as a desired level of security (i.e., larger polynomials are generally more secure), a desired number of operations (i.e., more operations can be performed on a larger polynomial), a desired processing time and/or memory resource requirement (i.e., larger polynomials generally require more processing time and/or memory requirements), etc. In example 312, a size of the encoded polynomial is determined and/or selected as n=4096. Thus, the combined polynomial for the real number a can be expressed as: $a=\Sigma_{i=0}^{n-1} a_i x_i$.

At 314, using the size of the encoded polynomial determined in operation 310, the process 300 wraps around the fractional coefficients as high-order coefficients. For example, the coefficients $x^{-1}+x^{-2}$ represent the fractional portion of the real number $a=5.75_{10}$. That is to say, $x^{-1}+x^{-2}$ returns the value of 0.75 when evaluated at $x=2$. Instead of expressing these coefficients as low-order coefficients, these coefficients can be wrapped around to the high-order coefficients of the encoded polynomial, as illustrated in the example 316. In this wrap-around process, the coefficients $x^{-1}+x^{-2}$ are wrapped to become $-x^{4095}-x^{4094}$ with the coefficients multiplied by $-1$ (negated). Thus, in this manner, the real number $a=5.75_{10}$ can be encoded as a single polynomial without scaling the real number to be an integer. For further illustration, in example 316 the polynomial $a=x^2+1+x^{-1}+x^{-2}$ is mapped to the polynomial $a=-x^{4095}-x^{4094}+0x^{4093}+\ldots+0x^3+x^2+1$ when the fractional coefficients are wrapped around as the high-order coefficients. As can be understood in the context of this disclosure, when the encoded and/or encrypted data is transmitted to the service provider 112 for computation in the computation module 120, the computation module 120 utilizes the combined polynomial encoding the real number to perform a secure computation. That is to say, the homomorphic encryption scheme understands the top coefficients represent the fractional portion of the real number, while bottom coefficients represent the integer portion of the real number.

Figure 4:
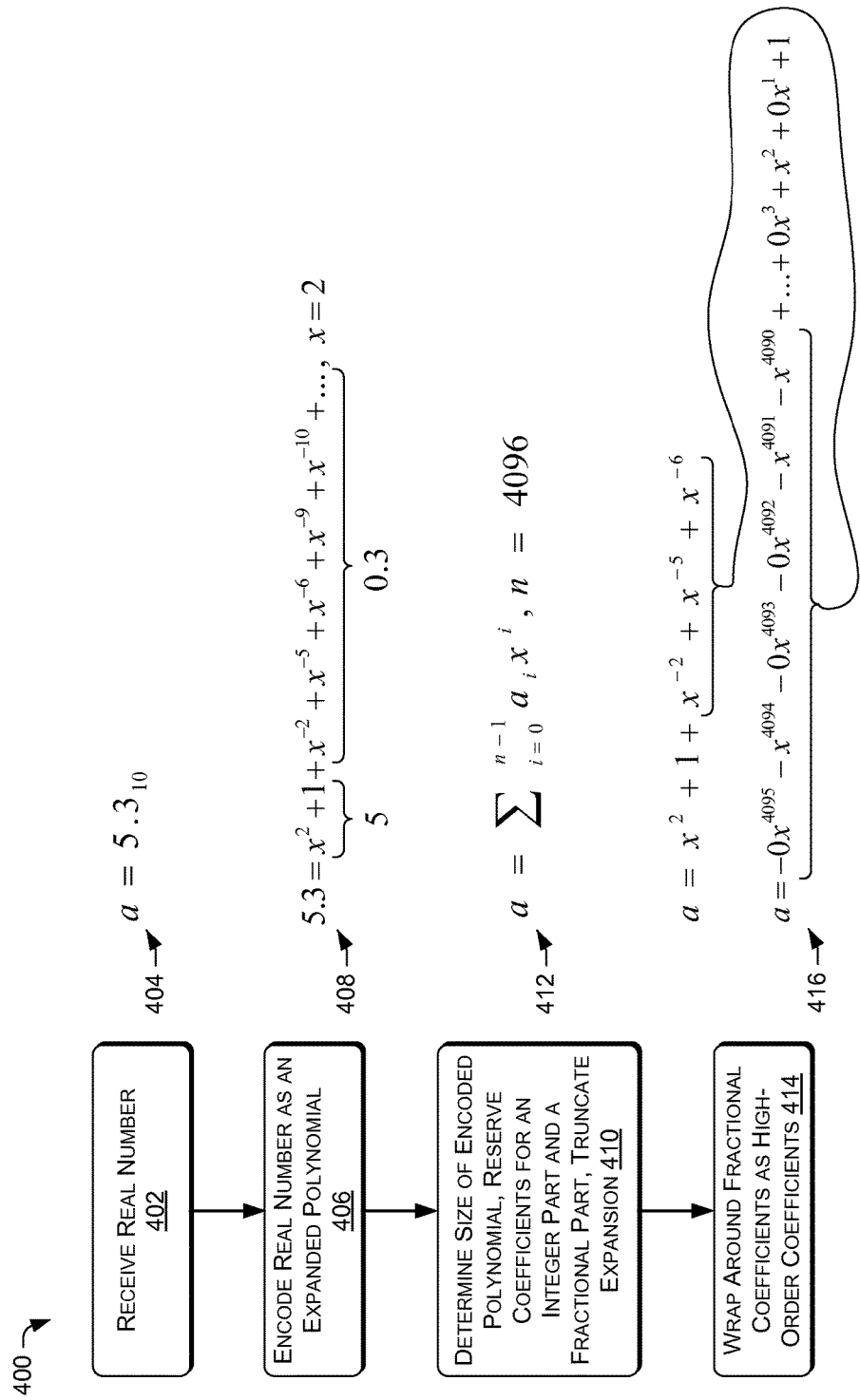
FIG. 4 illustrates another example process for encoding fractional parts of real numbers.

FIG. 4 illustrates an example process 400 for encoding fractional parts of real numbers, according to one example implementation. In one embodiment, the process 400 can be performed by the encoding/encrypting module 108 in the computing device 102 of FIG. 1. However, processes can be performed in other environments and by other devices as well.

In general, the process 400 includes receiving data (as a real number) in operation 402, which is encoded as a polynomial in a message space of a homomorphic encryption scheme. This process is performed by the computing device (such as the computing device 102) on data to generate encoded data, which can be encrypted and transmitted to a service provider (such as the service provider 112), for computation. An encoded and/or encrypted result is generated by the computation module 120 without decrypting or decoding the data, and an encrypted and/or encoded result is returned to the computing device 102.

One advantage of the process 400 is that it can operate directly on real numbers (e.g., example 404, where $a=5.3_{10}$, indicating that the number 5.3 is written in base 10), instead of having to scale a real number (e.g., by multiplying by 10) such that the real number is converted to an integer. As the process 400 avoids this scaling, the process 400 reduces processing time and memory requirements, by not tracking a scaling factor associated with each piece of encoded data during computation in the homomorphic encryption scheme. Thus, process 400 improves the functioning of the computer by reducing processing and memory requirements while encoding, encrypting, performing computations, and while decrypting and/or decoding an encoded result.

At 406, the process 400 encodes the real number as an expanded polynomial. For example, the number 5.3=101.01 $\overline{0011}_2$ (indicating that 5.3 is represented as "101.010011" in base 2, with the "0011" pattern repeating indefinitely).

Accordingly, the expanded polynomial for 5.3 can be written as shown in example 408, where $5.3=x^2+1+x^{-2}+x^{-5}+x^{-6}+x^{-9}+x^{-10}+\ldots$, $x=2$, which when evaluated at $x=2$ gives a result of 5.3.

At 410, the process 400 determines a size of an encoded polynomial. For example, this operation 410 can include receiving one or more encoding parameters determined by the parameter selection module 118. In some embodiments, the size of the encoded polynomial is determined by considering various factors, such as a desired level of security (i.e., larger polynomials are generally more secure), a desired number of operations (i.e., more operations can be performed on a larger polynomial), a desired processing time and/or memory resource requirement (i.e., larger polynomials generally require more processing time and/or memory requirements), etc. In example 412, a size of the encoded polynomial is determined and/or selected as n=4096. Thus, the combined polynomial for the real number a can be expressed as: $a=\Sigma_{i=0}^{n-1}a_i x^i$.

The operation 410 can further reserve coefficients for an integer part of the real number, can reserve coefficients for a fractional part of the real number, and can truncate the expansion of the polynomial. For example, for a polynomial of size n=4096, the bottom 1000 coefficients (or any other number) may be reserved for an integer part of the real number, while the top 50 coefficients (or any other number) may be reserved for a fractional part of the real number. Further, in a polynomial encoding an infinite expansion (such as the "0011" repeating coefficients for the number 5.3 expressed in base 2), the fractional coefficients may be truncated depending on a level of precision and/or depending on the number of coefficients reserved for the top coefficients. In this example, the expansion of $5.3=101.01\overline{0011}_2$ may be truncated after the first occurrence of the pattern "0011." In some embodiments, the number of coefficients reserved for the respective parts of the real number and/or a truncation/rounding may be determined by one or more encoding parameters determined by the parameter selection module 118.

At 414, using the size of the encoded polynomial, reserved coefficients, and truncation determined in operation 410, the process 400 wraps around the fractional coefficients as high-order coefficients. For example, the coefficients $x^{-2}+x^{-5}+x^{-6}$ represent the fractional portion of the real number $a=5.3_{10}$. That is to say, $x^{-2}+x^{-5}+x^{-6}$ returns the value of 0.296875 when evaluated at $x=2$. In this example, the result is approximate due to the truncation in the operation 410. Instead of expressing these coefficients as low-order coefficients, these coefficients can be wrapped around to the high-order coefficients of the encoded polynomial, as illustrated in the example 416. In this wrap-around process, the coefficients $x^{-2}+x^{-5}+x^{-6}$ are wrapped to become $-x^{4094}-x^{4091}-x^{4090}$, with the coefficients multiplied by $-1$ (negated). Thus, in this manner, the real number $a=5.3_{10}$ can be encoded as a single polynomial without scaling the real number to be an integer. For further illustration, in the example 416 the polynomial $a=x^2+1+x^{-2}+x^{-5}+x^{-6}$ is mapped to the polynomial $a=-0x^{4095}-x^{4094}-0x^{4093}-0x^{4092}-x^{4091}-x^{4090}+\ldots+0x^3+x^2+0x^1+1$ when the fractional coefficients are wrapped around as the high-order coefficients. As can be understood in the context of this disclosure, when the encoded and/or encrypted data is transmitted to the service provider 112 for computation in the computation module 120, the computation module 120 utilizes the combined polynomial encoding the real number to perform a secure computation. That is to say, the homomorphic encryption scheme understands the top coefficients represent the fractional portion of the real number, while bottom coefficients represent the integer portion of the real number.

By way of example, the coefficients are reserved in the polynomial to define regions in the polynomial that represent a number during operations such as addition and multiplication. For example, when two polynomials are multiplied together (encoded as described in the process 400), the fractional part of the polynomial will grow "down" towards the bottom of the polynomial, and the integer portion of the polynomial will grow up towards the top of the polynomial as the integer portion grows bigger. The fractional part of the polynomial growing "down" is discarded when decoding. As an example of such discarding, in an example where two numbers representing heights of individuals are multiplied together (e.g., 1.75 m and 1.57 m), both of which heights have two digits of precision, the answer 2.7475 $m^2$ has a fractional part "growing down." However, this answer does not contain any real information past the precision of the inputs, and accordingly, the result can be rounded or truncated within the precision allowed (e.g., resulting in an answer of 2.75 $m^2$ or 2.74 $m^2$, respectively). Thus, the fractional parts may be discarded in accordance with a precision or a set number of coefficients. In some embodiments, when performing multiplication on such encoded polynomials, the fractional part (growing down) and the integral part (growing up) can be constrained to not allow overlap, thereby preventing any corruption of information during operations.

Figure 5:
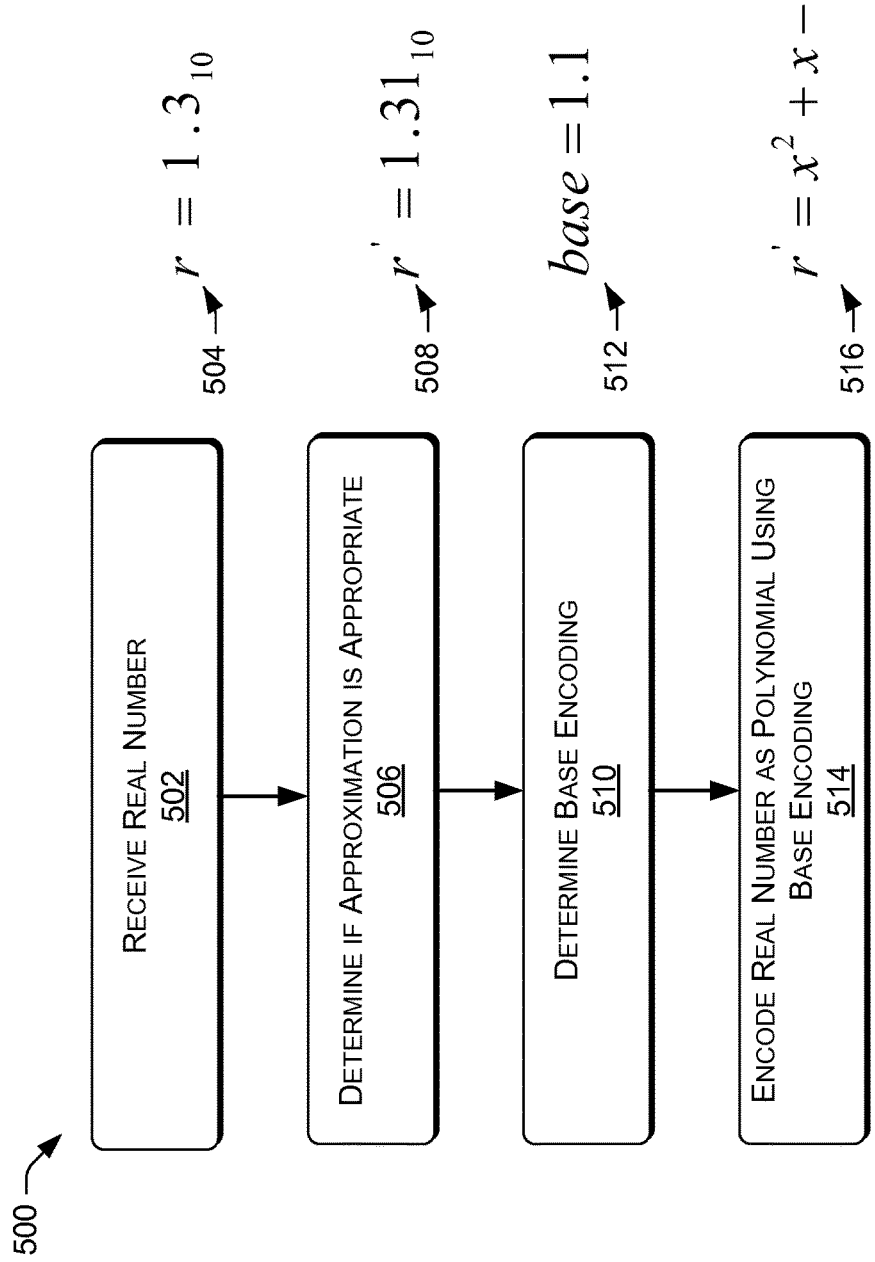
FIG. 5 illustrates an example process for encoding numbers using a fractional base.

FIG. 5 illustrates an example process 500 for encoding fractional parts of real numbers, according to one example implementation. In one embodiment, the process 500 can be performed by the encoding/encrypting module 108 in the computing device 102 of FIG. 1. However, processes can be performed in other environments and by other devices as well. Further, process 500 can be used either singularly or in combination with the various techniques and/or techniques discussed herein.

In general, the process 500 includes receiving data (as a real number) in operation 502. If appropriate, this number can be rounded and/or represented as an approximation. In some embodiments, a base encoding can be determined and/or selected according to the resolution required for rounding the data, and the determined base can be used to generate encoded data as a polynomial. This process 500 is performed by the computing device (such as the computing device 102) on data to generate encoded data, which can be encrypted and transmitted to a service provider (such as the service provider 112), for computation. An encoded and/or encrypted result is generated by the computation module 120 without decrypting or decoding the data, and an encrypted and/or encoded result is returned to the computing device 102.

One advantage of the process 500 is that it can operate directly on real numbers (e.g., example 504, where $r=1.3_{10}$, indicating that the number 1.3 is written in base 10), and can generate a polynomial with a low number of terms. Further, as the process 500 can incorporate rounding or approximating numbers, which often allows for a more efficient encoding than encoding an exact value, the process 500 reduces processing time and memory requirements. Thus, process 500 improves the functioning of the computer by reducing processing and memory requirements while encoding, performing computations, and while decrypting and/or decoding an encoded result.

At 506, the process determines if an approximation of the real number received in operation 502 is appropriate. For example, some application can require precise encoding of data, such as in banking transactions or financial data. In another example, some applications such as pattern recognition or image analysis can allow for approximation of numbers. Further, whether the data can be approximated or rounded can be determined by the parameter selection module 118 in FIG. 1, or can be determined by an administrator, programmer, an available amount of processing, storage requirements, etc. For example, it can be determined that the real number $r=1.3_{10}$ can be approximated as example 508, where $r'=1.31_{10}$. In some embodiments, operation 506 can include determining an allowable amount of error, a threshold, and/or an upper and lower bound for an allowed approximation of the real number received in operation 502.

At 510, the process determines a base encoding to encode the approximated value. In some embodiments, the base encoding can be determined based on the value of the real number received in operation 502, while in some embodiments, the approximation $r'=1.31_{10}$ can be determined along with determining the base encoding, which is illustrated in example 512 as base=1.1. That is to say, in some embodiments, operations 506 and 510 can be performed iteratively to determine and/or select a base encoding and to determine an approximated value within an error threshold allowed for the real number received in operation 502, for example.

At 514, the operation encodes the real number as a polynomial using the base encoding determined in operation 510. For example, for the approximated example 508 as $r'=1.31_{10}$ and using base=1.1, the approximated real number can be encoded as a polynomial as $r'=x^2+x-1$ (example 516), which, when evaluated at x=1.1, gives $r'=1.31_{10}$.

It can be understood in the context of this disclosure that any number can be selected as a small fractional base, such as base=1.2, 1.01, 1.001, etc., with various tradeoffs associated with each base, such as the fidelity or resolution required to represent or approximate numbers, the size of a polynomial required to represent numbers, the expected inputs, the application of utilizing the underlying data, processing time, memory requirements, etc. Further, the process 500 can include operations to truncate coefficients beyond a set number of coefficients. For example, truncating a polynomial to a few coefficients (e.g., two) generates a sparse representation of the number as a polynomial, leading to faster processing time, and reducing a probability of wrapping coefficients around, thereby eliminating potential problems during decoding. In another embodiment, the fractional base, such as base=1.2, 1.01, 1.001, etc., can be selected to generate a polynomial using a particular number of coefficients, such as one or two coefficients, thereby providing a sparse representation leading to improved performance. Thus, the process 500 further improves a functioning of a computer in this manner.

Figure 6:
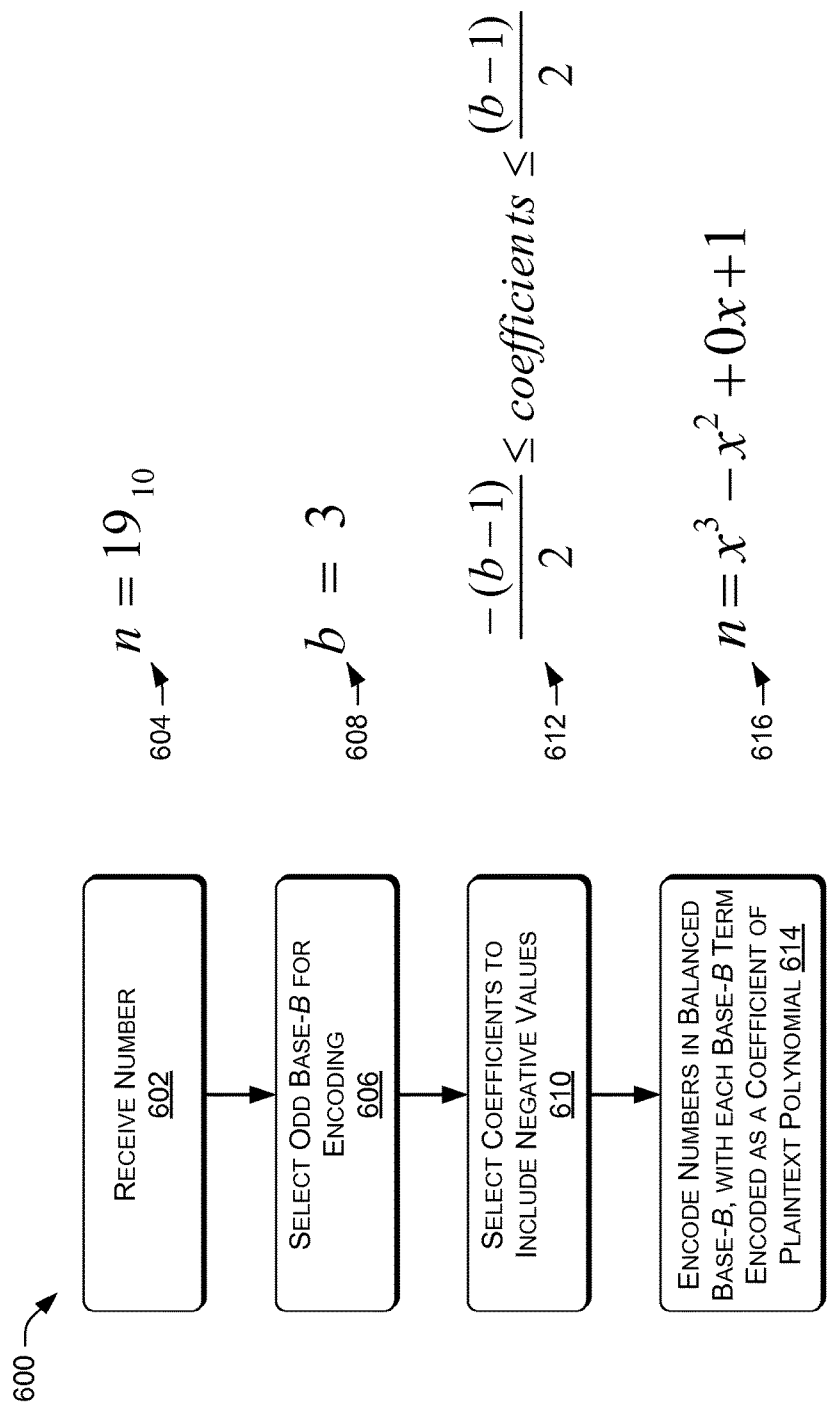
FIG. 6 illustrates an example process for encoding numbers in a balanced odd base.

FIG. 6 illustrates an example process 600 for encoding numbers in a balanced odd base, according to one example implementation. In one embodiment, the process 600 can be performed by the encoding/encrypting module 108 in the computing device 102 of FIG. 1. However, processes can be performed in other environments and by other devices as well. Further, process 600 can be used either singularly or in combination with the various techniques and/or techniques discussed herein.

In general, the process 600 includes receiving data (e.g. as an integer or as a real number) in operation 602. If appropriate, an odd base can be selected for encoding, with coefficients selected to include negative numbers when generating encoded data as a polynomial. This process 600 is performed by the computing device (such as the computing device 102) on data (such as example 604, where $n=19_{10}$) to generate encoded data, which can be encrypted and transmitted to a service provider (such as the service provider 112), for computation. An encoded and/or encrypted result is generated by the computation module 120 without decrypting or decoding the data, and an encrypted and/or encoded result is returned to the computing device 102.

One advantage of the process 600 is that by encoding numbers in a balanced odd base, as operations are performed on the data in the computation module 120, for example, operations involving positive and negative coefficients can, on average, result in a zero coefficient, thereby reducing a growth of the coefficients of a polynomial during computations. In some embodiments, this can allow more operations to be performed on a polynomial of fixed length, or can allow a shorter polynomial to be used to guarantee the same number of computations, which in turn improves processing and memory requirements for a given application, program, or operation. Thus, process 600 improves the functioning of the computer by reducing processing and memory requirements while encoding, encrypting, performing computations, and while decrypting and/or decoding an encoded and/or encrypted result.

At 606, the process selects an odd base for encoding, such as b=3 given as example 608. For example, the parameter selection module 118 in FIG. 1 can specify the odd base for encoding, and/or an administrator or programmer can determine the odd base for encoding based on the data received in operation 602, or based on the application using the homomorphic encryption. For example, the application can require a large number of computations that can benefit from managing the growth of the coefficients by having the coefficients, on average, go to zero. As can be understood in the context of this disclosure, any odd base (other than 1 or −1) can be selected, such as b=3, 5, 7, 9, 11, etc.

At 610, the number received in operation 602 can be expressed using the base selected in operation 606, and the coefficients can be selected to include negative values. By way of example, for the example 608 as b=3, the polynomial coefficients may be selected as $$\frac{-(b-1)}{2} \leq \text{coefficients} \leq \frac{(b-1)}{2},$$

illustrated in example 612. Thus, using a base b=3, the coefficients may be selected as {−1, 0, 1}.

In 614, the operation includes encoding numbers in balanced base b, with each base-b term encoded as a coefficient of a plaintext polynomial. In example 616, the number $n=19_{10}$ can be expressed as a polynomial $x^3-x^2+0x+1$, which when evaluated at x=3 returns a result of 19. As discussed above, when operations are subsequently performed on the polynomial encoding using the balanced base-b encoding, positive and negative coefficient terms can cancel out (e.g., when adding two encoded polynomials), thereby preventing the growth of the polynomial to improve the function of the computer.

By way of another example of the process 600, using a base b=11, the coefficients that may be selected include {−5, −4, −3, −2, −1, 0, 1, 2, 3, 4, 5}. Given a number $n=123456789_{10}$, this may be encoded as a polynomial $x^8-5x^7+4x^6-3x^5-5x^4+3x^3-x^2+5$, which when evaluated at x=11 returns a result of 123456789.

Figure 7:
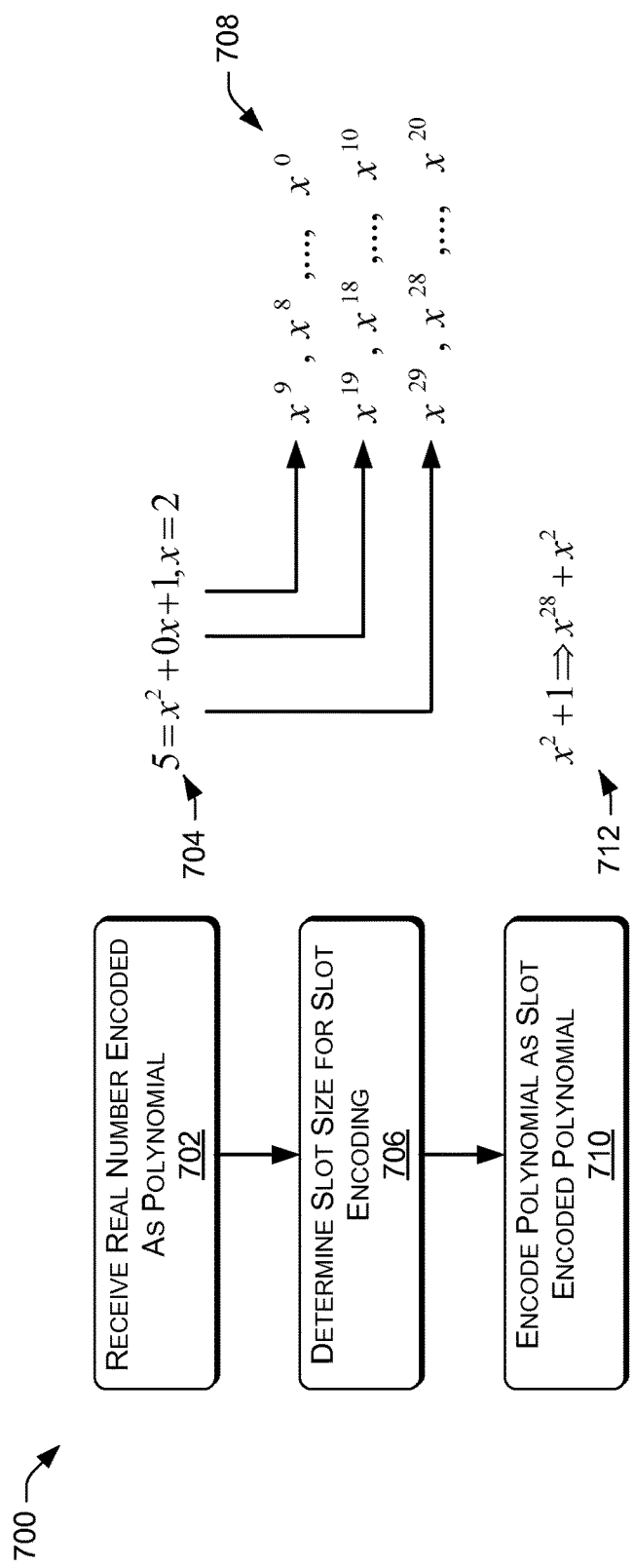
FIG. 7 illustrates an example process for encoding numbers using slot encoding.

FIG. 7 illustrates an example process 700 for encoding numbers using slot encoding, according to one example implementation. In one embodiment, the process 700 can be performed by the encoding/encrypting module 108 in the computing device 102 of FIG. 1. However, processes can be performed in other environments and by other devices as well. Further, process 700 can be used either singularly or in combination with the various techniques and/or techniques discussed herein.

In general, the operation 702 includes receiving data (e.g. as an integer or as a real number) encoded as a polynomial in operation 702. For example, a polynomial such as $5=x^2+0x+1$, illustrated as example 704, can be received as a polynomial, which can have been encoded according to embodiments of this disclosure (such as in example 308 of FIG. 3). In some embodiments, the process 700 can receive data not yet encoded as a polynomial, and can encode the data as a polynomial directly using the slot encoding techniques discussed herein. However, as can be understood in the context of this disclosure, the slot encoding can be applied to data previously encoded as a polynomial to illustrate the aspects of this technique. Following receipt of the data encoded as a polynomial (e.g., using any of the techniques discussed in this disclosure, for example) the process 700 can determine a slot size for slot encoding. Following this determination, the polynomial can be encoded as a slot-encoded polynomial, which can be encrypted and transmitted to a service provider (such as the service provider 112), for computation. An encoded and/or encrypted result is generated by the computation module 120 without decrypting or decoding the data, and an encrypted and/or encoded result is returned to the computing device 102.

One advantage of the process 700 is that encoding polynomials using slot encoding allows for more operations to be performed on the data in the computation module 120. For example, as operations are performed on the encoded polynomials, the size of the coefficients increases, and it can be possible for the polynomial to "run out" of space to perform operations (such as addition, subtraction, multiplication, and division). Using slot encoding can reduce the amount by which the polynomial coefficients grow, ensuring a polynomial can be properly decoded after operations are performed. Therefore, the process 700 can improve processing abilities for a given application, program, or operation, and improves the functioning of the computer by increasing the number of available computations that can be performed on the data.

At 706, the operation determines a slot size for a slot encoding of the polynomial received in operation 702. For example, operation 706 can determine that each coefficient can be represented by 5, 10, 20, or any number of slots, as can be understood in the context of this disclosure. In various embodiments, the number of slots to use for slot encoding can be determined by the parameter selection module 118 of FIG. 1. As discussed above, it can be understood in the context of this disclosure that for a polynomial of a given length, increasing the number of slots for each coefficient can reduce the amount of data stored in that polynomial, but can increase the number of operations that can be performed on that polynomial. Thus, selecting or determining the slot size is based at least in part on amount of data to be encoded and the number of operations (e.g., an upper-bound, worst-case estimate, average-case estimate, or maximum possible number of operations) to be performed on the polynomial.

Example 708 illustrates a slot size of 10 for the slot encoding of the polynomial example 704. For example, while using a slot size of 10, the integer portion of the polynomial example 504 (i.e., 1, or $x^0$) can be encoded in the polynomial example 708 at $x^9, x^8, \ldots, x^0$. That is to say, the integer 1 can be encoded as a coefficient for any term $x^9, x^8, \ldots, x^0$, given a slot size of 10. Next, the $x^1$ portion of the polynomial example 704 can be encoded at $x^{19}, x^{18}, \ldots, x^{10}$. However, it can be understood in the context of this disclosure that because the coefficient term in example 704 is $0*x^1$, the coefficient term will be represented as a zero term in the slot encoded polynomial. Further, the $x^2$ portion of the polynomial can be encoded at slots $x^{29}, x^{28}, \ldots, x^{20}$. It can be understood in the context of this disclosure that the arrows mapping the coefficients in the example 704 to the slots illustrated in example 708 are for illustrative purposes only, to visually illustrate the slot encoding techniques discussed herein.

At 710, the operation includes encoding the polynomial (received in operation 702, for example) as the slot encoded polynomial. For example, the coefficients in the polynomial example 704 can be mapped to the available slots (as illustrated in example 708) to form the slot encoded polynomial example 712, represented as $x^2+1 \Rightarrow x^{28}+x^2$. That is to say, the received polynomial $x^2+1$ can be encoded as a slot encoded polynomial as $x^{28}+x^2$. As can be understood in the context of this disclosure that slots can be selected at random, according to a distribution algorithm, or according to parameters determined by the parameter selection module 118, of FIG. 1. As can be further understood in this context of this disclosure, operations can be performed on slot encoded polynomials, which can reduce the computational burden of managing coefficients in the polynomials. For example, using the techniques described herein, the number 5 can be encoded as a polynomial $x^2+1$, which can also be represented as a slot-encoded polynomial (of a slot size of 10) as $x^{28}+x^2$. It can be further understood in the context of this disclosure that the number 5 can also be represented as a slot-encoded polynomial as $x^{23}+x^8$, and the polynomials $x^{28}+x^2$ and $x^{23}+x^8$ can be added (e.g., in the computation module 120) to generate a summed polynomial $x^{28}+x^{23}+x^8+x^2$, which when decoded (e.g., by the decoding module 110) can be understood to represent the sum of 10.

Figure 8:
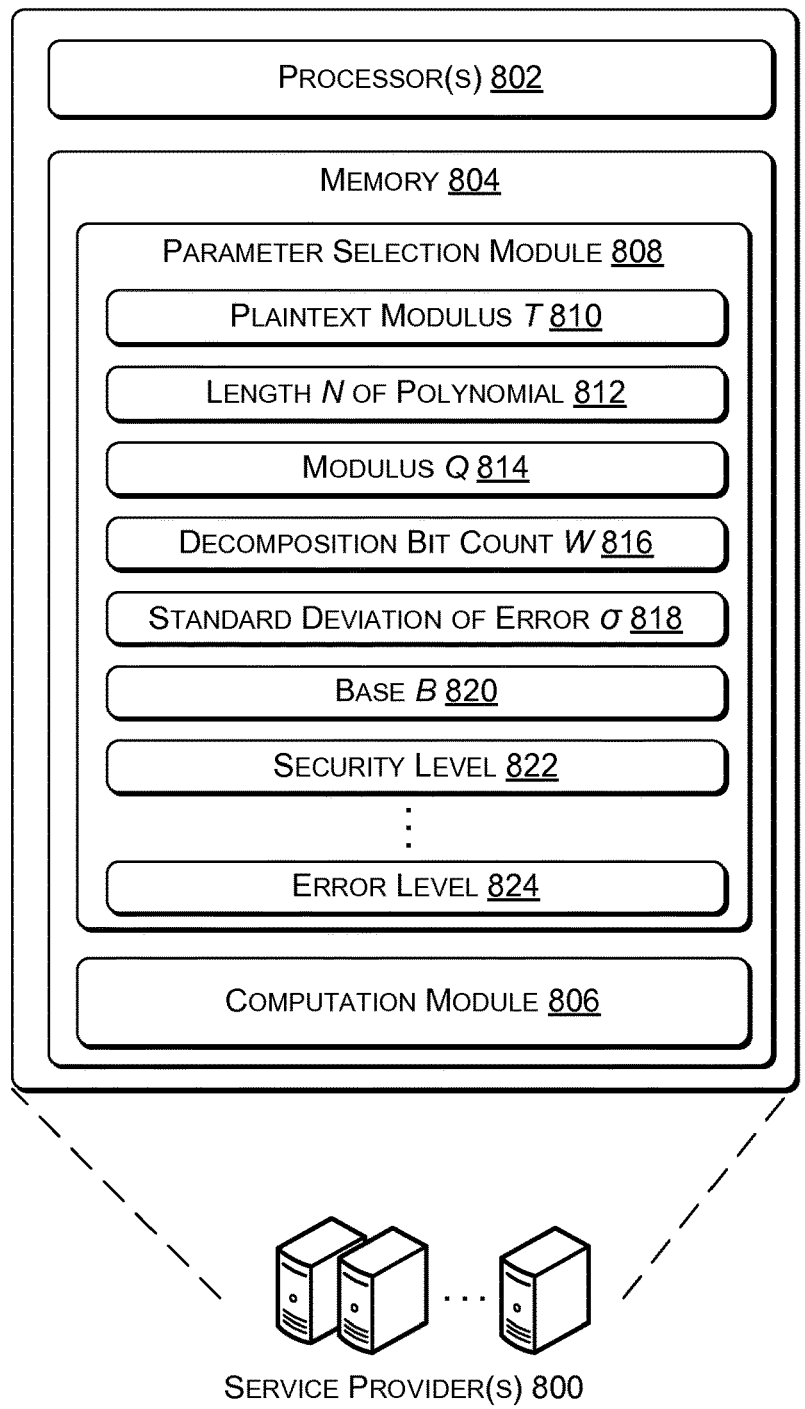
FIG. 8 illustrates an example service provider for automatically selecting parameters using an error growth simulator.

FIG. 8 illustrates an example service provider(s) 800 for automatically selecting parameters using an error growth simulator, according to one example implementation. In some embodiments, the service provider 800 can correspond to the service providers 112 and 204 of FIGS. 1 and 2.

The one or more computing devices of the service provider 800 can include one or more processor(s) 802 and memory 804. The one or more processor(s) 802 can comprise a single processing unit or a number of units, each of which could include multiple different processing units. The one or more processor(s) 802 can include, for example, one or more microprocessors, microcomputers, microcontrollers, digital signal processors, CPUs, GPUs, security processors (e.g., secure cryptoprocessors), etc.

The memory 804 can include a computation module 806, which can correspond to the computation module 120 in FIG. 1. As can be understood in the context of this disclosure, the computation module 806 can include any program, computation, or operation that can be performed on data. In various embodiments, the computation module 806 can perform computations on the received encoded and/or encrypted data and can generate an encoded and/or encrypted result, which can be transmitted to a computing device such as the computing device 102 of FIG. 1 for subsequent decryption and/or decoding. In various embodiments, the computation module 806 can perform addition, subtraction, multiplication, and/or division in any combination on the encoded and/or encrypted data, as would be understood in the context of this disclosure.

The memory can further include a parameter selection module 808 (e.g., corresponding to the parameter selection module 118 in FIG. 1) for automatically selecting parameters using an error growth simulator. For example, the parameters to be selected can include, but are not limited to, a plaintext modulus T 810, a length N of a polynomial 812, a modulus Q 814, a decomposition bit count W 816, a standard deviation of error a 818, a base B 820, a security level 822, an error level 824, and the like.

In some embodiments, the plaintext modulus T 810 can be set to be larger than any coefficient appearing in any plaintext polynomial at any point in the computations (e.g., coefficients in a "fresh" polynomial, or in a polynomial after operations have been performed, such as addition and/or multiplication). In one simplified example, assuming a base=2, the coefficients present in a freshly encoded polynomial (i.e., before any operations are performed) are limited to either 0 or 1. However, in an example where the number 3 is encoded as x+1, and two encoded polynomials are added together, the coefficients in the polynomial grow to 2x+2. Thus, the plaintext modulus T must be set larger than the coefficients present in any polynomial (e.g., larger than 2) to avoid modular reduction, which can occur if the coefficients increase larger than the plaintext modulus T. However, as the plaintext modulus T increases, an error grows during homomorphic operations. Therefore, the plaintext modulus T can be set above any coefficient value that may occur in any encoded polynomial, without being higher than required, to prevent any unnecessary increase in the rate at which noise grows during operations.

In some embodiments, the length N of the polynomial 812 can correspond to the length of the encoded polynomials illustrated in example 312 and example 412. In some embodiments, the length N of the polynomial 812 is a multiple of 2, such that N=1024, 2048, 4096, or 8192, although it can be understood in the context of this disclosure that these are non-limiting examples, and N can depend on a data type or application, as discussed herein. For example, the length N of the polynomial 812 can depend on a desired level of security, the size of input data, the number of operations to be performed, the processing capabilities of a computing device, an amount of available memory at a computing device, etc.

In some embodiments, the modulus Q 814 is used in encoding the plaintext data prior to encryption, and in some embodiments, the modulus Q is a large prime number. In some embodiments, the modulus Q 814 can determine a coefficient space in a polynomial ring and/or a dimension of a lattice, which can determine a degree of polynomial to be handled.

In some embodiments, the decomposition bit count W 816 can be used in a key switching procedure when computations modify an encryption key. For example, when two encoded and encrypted numbers using a secret key S are multiplied, the encoded and encrypted result will have a secret key $S^2$. In some embodiments, when the encoded and encrypted result is sent to a computing device (such as the computing device 102), the computing device can decrypt the result using a secret key $S^2$. Instead of requiring the secret key $S^2$ to decrypt the result, the service provider 800 can perform a key switching procedure, which can convert the secret key $S^2$ to the secret key S. The decomposition bit count W 814 can be used in such a key switching procedure. In some embodiments, this key switching procedure is an expensive (computationally) operation. To speed up processing, a larger decomposition bit count W 814 can be used, although in this case, a large W can introduce error in the ciphertext, thereby degrading data or invalidating a result.

In some embodiments, the standard deviation of error a 818 can depend on the length N of the polynomial 812 and the modulus Q 814.

In some embodiments, the base B 820 can be determined by the parameter selection module 808. For example, the base B 820 can include any base larger than 1, for example, 5, 3, 2, 1.2, 1.1, 1.01, etc.

In some embodiments, the parameter selection module 808 can receive inputs, such as a desired security level 822 and/or an acceptable error level 824. For example, the parameter selection module 808 can include a user interface where a user can indicate a desired security level 822 (e.g., "low," "medium," or "high") or can indicate an acceptable error level 824 (e.g., 1% error, 5% error), or whether or not approximations, rounding, and/or truncations are allowed. In some embodiments, a user can specify whether slot encoding can be used, as well as the number of slots to use. As can be understood in the context of this disclosure, any number of parameters can be added or adjusted by the user, depending on the sophistication of the user, and/or the desired complexity of the parameter selection module 808.

Figure 9:
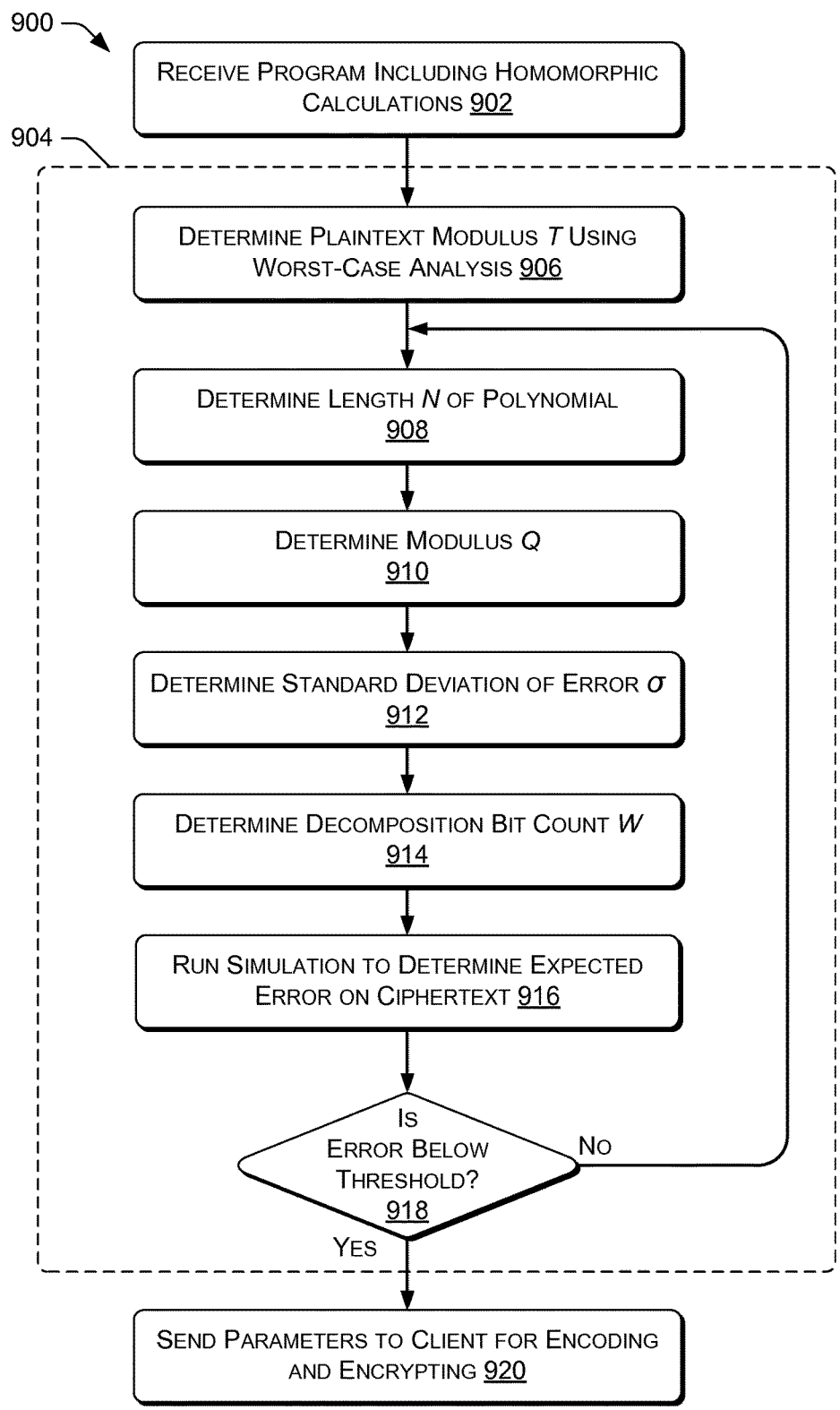
FIG. 9 illustrates an example process for automatically selecting parameters using an error growth simulator.

FIG. 9 illustrates an example process 900 for automatically selecting parameters using an error growth simulator, according to one example implementation. In one embodiment, the process 900 can be performed by the parameter selection modules 118 or 808 in the service providers 112 or 800 of FIGS. 1 and 8, respectively. However, processes can be performed in other environments and by other devices as well. Further, process 900 can be used either singularly or in combination with the various techniques and/or techniques discussed herein.

In general, the operation 902 includes receiving a program including one or more homomorphic calculations. For example, a program received in operation 902 can be uploaded to a service provider (such as the service providers 112 or 800) by a user, or can be selected from a library of components located at a service provider. In some embodiments, a program can be received by selecting or building operations from a library of components including homomorphic calculations and/or operations. Following the receipt of the program in operation 902, various parameters are optimized for encoding and/or encrypting of data to be used in the received program, which can collectively be referred to as operation 904. After parameters are determined, they can be returned to a user or computing device.

One advantage of the process 900 is that optimizing parameters for encoding and encrypting allows for security and confidentiality of data to be maintained while improving the processing requirements and memory requirements of the homomorphic operations. For example, the parameters can be tailored to generate polynomials large enough to guarantee operation in a worst-case scenario or an average-case scenario, without being too large as to become unmanageable. Further the process 900 can be performed automatically on an actual program intended to be used, thereby increasing the accuracy and probability that the parameters will result in an efficient operation. Therefore, the process 900 can improve processing abilities for a given application, program, or operation, and can improve the functioning of the computer by improving a processing abilities and improving memory requirements when performing homomorphic operations.

At 904, the operation optimizes various parameters for the encoding and/or encrypting of data. For example, operations included in the operation 904 can include generating at least one encoding parameter and at least one encrypting parameter based on a result of the simulation.

At 906, the operation determines the plaintext modulus T using a worst-case analysis. In some embodiments, the plaintext modulus T is determined to guarantee that the value of the plaintext modulus T is larger than any coefficient present in the plaintext polynomial at any time during any operation. In some embodiments, the plaintext modulus T can be determined using an average-case analysis. Therefore, operation 906 can include determining an upper bound for the largest coefficient that can be present in a plaintext polynomial. In some embodiments, the largest coefficient can be determined using a worst-case analysis, while in some embodiments, the largest coefficient can be determined by analyzing actual or simulated data. For example, the operation 906 can include determining a data type of any input data, a range of the input data, as well as a largest coefficient present in a polynomial based on the determined data type or input data.

At 908, the operations determine a length N of the polynomial. In some embodiments, the length N of the polynomial can be a power of 2, such as N=1024, 2048, 4096, or 8192, although it can be understood in the context of this disclosure that these are non-limiting examples, and N can depend on a data type or application, as discussed herein. For example, the length N of the polynomial can depend on a desired level of security, the size of input data, the number of operations to be performed, the processing capabilities of a computing device, an amount of available memory at a computing device, etc.

At 910, the modulus Q can be determined. In some embodiments, the modulus Q can be a prime number. In some embodiments, the modulus Q and the length N of the polynomial can be chosen as a pair, such that the modulus Q is predetermined and associated with a particular length N of the polynomial.

At 912, the standard deviation of error a can be determined. In some embodiments, the standard deviation of error is determined based on the length N of the polynomial and the modulus Q.

At 914, a decomposition bit count W can be determined. As discussed above, the decomposition bit count W can be used in a key switching operation. Details of determining the decomposition bit count W are also described in connection with FIG. 10.

At 916, a simulation is run to determine an expected error on a ciphertext. In some embodiments, the simulation does not need any actual encrypted data or plaintext data to operate. Instead, the simulation can run using only the estimated sizes of the plaintext components. The simulation can determine the error growth associated with each computation to determine the error growth in the ciphertexts throughout the simulated operations.

At 918, it is determined if the error is below a threshold. In some embodiments, the threshold can be determined as an average-case analysis of the simulated error, with an error above the threshold resulting in a failure when a result is to be decrypted and/or decoded. For example, if the parameters are not optimized, an error of the simulator can grow and make it impossible to decrypt a result of the computations. In the event the error is above a threshold, the operations can return to determine one or more parameters (e.g., starting at operation 908). Following the newly determined parameters, the process can simulate the error again and can determine at operation 918 if the error is below the threshold. Thus, the process 900 can be performed iteratively to optimize the parameters to be used in the homomorphic encryption scheme.

At 920, the parameters optimized in the operations 902-918 can be sent to a client computing device, and the parameters can be used by the computing device to encode, encrypt, decrypt, and decode the data to be used in homomorphic calculations.

Figure 10:
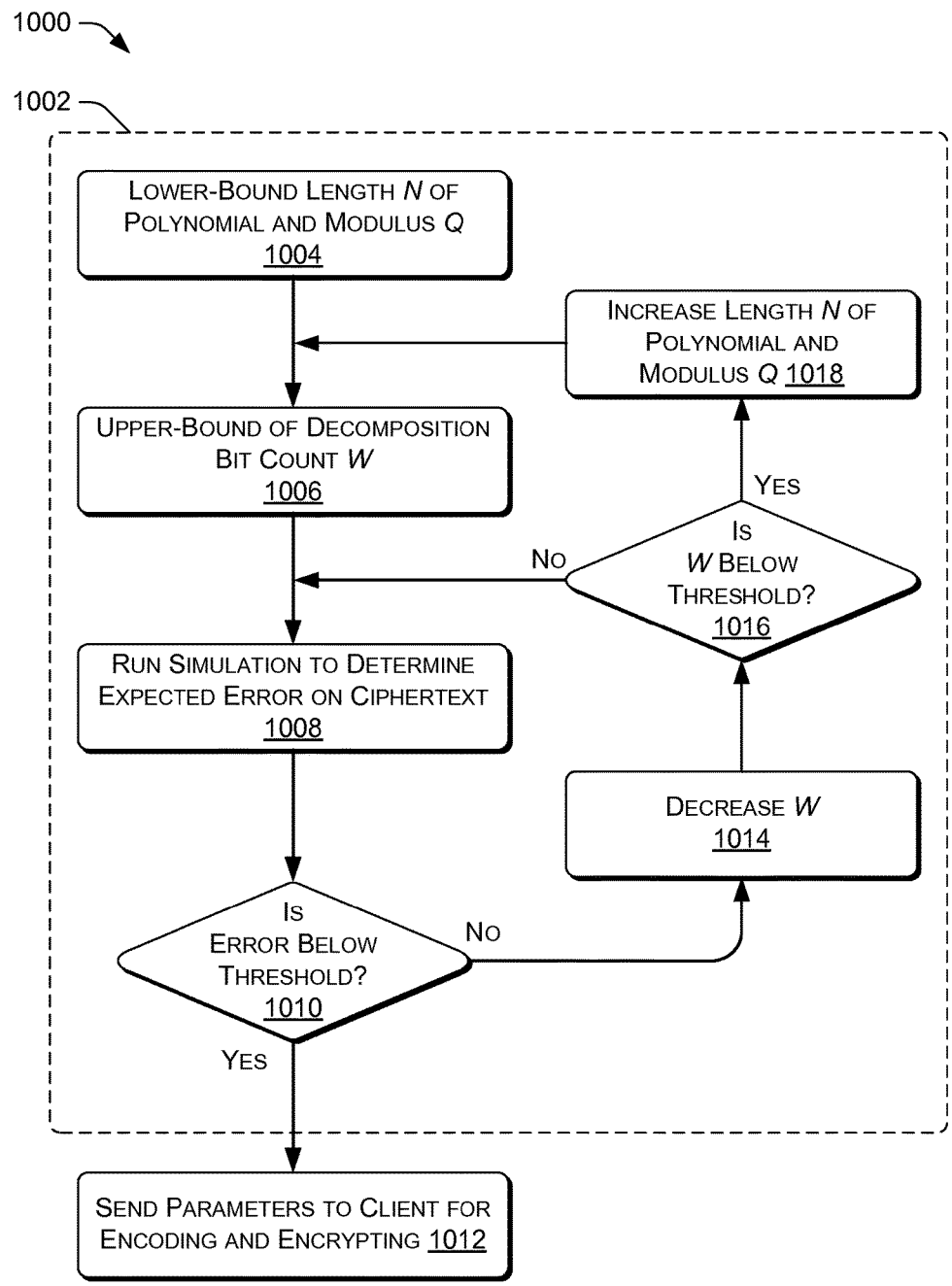
FIG. 10 illustrates another example process for automatically selecting parameters using an error growth simulator.

FIG. 10 illustrates an example process 1000 for automatically selecting parameters using an error growth simulator, according to one example implementation. In one embodiment, the process 1000 can be performed by the parameter selection modules 118 or 808 in the service providers 112 or 800 of FIGS. 1 and 8, respectively. However, processes can be performed in other environments and by other devices as well. Further, process 1000 can be used either singularly or in combination with the various techniques and/or techniques discussed herein. For example, process 1000 (or individual operations in the process 1000) can be used in combination with, or instead of, the operations identified in the process 900 for optimizing parameters. Therefore, the process 1000 can also improve processing abilities for a given application, program, or operation, and can also improve the functioning of the computer by improving a processing abilities and improving memory requirements when performing homomorphic operations.

At 1002, the operation optimizes various parameters for the encoding and/or encrypting of data. For example, operations included in the operation 1002 can include generating at least one encoding parameter and at least one encrypting parameter based on a result of the simulation.

At 1004, the operation includes determining a lower-bound for the length N of the polynomial and a lower-bound for the modulus Q. Because the length N of the polynomial is correlated with the amount of processing required to perform a homomorphic operation using that polynomial, the operation 1004 can begin with a lower-bound to use a small size. In some embodiments, the lower-bound of the length N of the polynomial is determined by a minimum level of security and/or the minimum size required to perform a number of operations. In some embodiments, the operation 1004 begins at predefined lower-bound. In some embodiments, the length N of the polynomial is determined and/or selected in conjunction with the modulus Q, as a {N, Q} pair.

At 1006, the operation determines an upper-bound of the decomposition bit count W. As described above, the decomposition bit count W can be used in a key-switching operation, with a larger W generally allowing for faster processing. However, a larger W generally also introduces more error in a ciphertext during a key-switching procedure when compared to a smaller W. Therefore, in some embodiments, the operation 1006 can determine an upper-bound W to prioritize speed. However, it is understood in the context of this disclosure that the operation 1006 can begin with a lower-bound of W to minimize noise or degradations to a ciphertext, and iteratively increase W until a desired operation is obtained.

At 1008, a simulation is run to determine an expected error on the ciphertext, and at 1010, it is determined whether the expected error is below a threshold. In some embodiments, operations 1008 and 1010 can correspond with operations 916 and 918 in the process 900.

At 1012, if the error is below a threshold, which in some embodiments indicates that the ciphertext can be properly decrypted and decoded when presented to a computing device, the parameters are sent to a client for encoding and encrypting. In some embodiments, the operation 1012 can correspond to the operation 920 in the process 900.

If the error is not below a threshold at operation 1010, the process can decrease the decomposition bit count W at operation 1014. Next, at operation 1016, it is determined if the decomposition bit count W is below a threshold. If the decomposition bit count W is not below a threshold (operation 1016), the processing moves to operation 1008 to run the simulation to determine an expected error using an updated W value. In some embodiments, the threshold for the decomposition bit count W can be set arbitrarily, or can be set at a lowest possible value. In some embodiments, the lower bound for W can be set when an amount of processing and/or memory required to execute a key-switching operation using a decomposition bit count W (lower bound) at a particular $\{N, Q\}$ pair would be greater than an amount of processing and/or memory required to execute a key-switching operation using a decomposition bit count W (upper bound) at a larger $\{N, Q\}$ pair.

If the decomposition bit count W is below a threshold in operation 1016, operation 1018 increases the length N of the polynomial and the modulus Q, and continues processing by determining an upper-bound of the decomposition bit count W, and determining an expected error. Thus, the process 1000 can be performed iteratively to optimize the parameters to be used in the homomorphic encryption scheme.

Therefore, as described herein, optimized parameters can be determined and/or selected for improved homomorphic encryption, including improved operation of a computer by improving processing and/or memory requirements for the homomorphic encryption. Further, the optimizing of parameters and encodings discussed herein may also be used outside the strict context of homomorphic encryption applications, in any application where secure computations are required.

Example Clauses

Example A, at least one device comprising: one or more processors; and memory storing modules that, when executed by the one or more processors, cause the at least one device to perform operations comprising: receiving a data set including a real number, the real number including an integer portion and a fractional portion; and encoding the integer portion and the fractional portion in a polynomial, the fractional portion of the real number represented as at least one top coefficient of the polynomial, wherein the at least one top coefficient is determined by a length of the polynomial determined for at least one homomorphic operation, and wherein the real number is encoded in the polynomial as a single polynomial without converting the real number to an integer.

Example B, the at least one device of Example A, wherein the encoding the integer portion and the fractional portion in the polynomial reduces a processing time of the one or more processors when performing the at least one homomorphic operation.

Example C, the at least one device of Example A or Example B, wherein the operations further comprise: generating an expanded polynomial representing the real number using base two, the expanded polynomial including at least one coefficient raised to a negative power; wrapping around the at least one coefficient raised to the negative power as the at least one top coefficient of the polynomial; and negating the at least one top coefficient of the polynomial.

While Example A through Example C are described above with respect to a device, it is understood in the context of this document that the content of Example A through Example C may also be implemented via a system, computer storage media, and/or a method.

Example D, a computer-implemented method for performing encoding for homomorphic encryption by at least one processor, the method comprising: receiving a data set including a real number, the real number including an integer portion and a fractional portion; and encoding the integer portion and the fractional portion in a polynomial, the fractional portion of the real number represented as at least one top coefficient of the polynomial, wherein the at least one top coefficient is determined by a length of the polynomial determined for at least one homomorphic operation.

Example E, the method of Example D, wherein the real number is encoded in the polynomial as a single polynomial without converting the real number to an integer.

Example F, the method of Example E or Example D, wherein the encoding the integer portion and the fractional portion in the polynomial reduces a processing time of the at least one processor when performing the at least one homomorphic operation.

Example G, the method of any one of Examples D through F, further comprising: encrypting the polynomial as a ciphertext; transmitting the ciphertext via a network to a server; and receiving, from the server, a result of a performance of the at least one homomorphic operation on the ciphertext.

Example H, the method of any one of Examples D through G, wherein the at least one homomorphic operation includes at least one of addition, subtraction, multiplication, or division.

Example I, the method of any one of Examples D through H, wherein the encoding the integer portion and the fractional portion in the polynomial further includes: generating an expanded polynomial representing the real number using base two, the expanded polynomial including at least one coefficient raised to a negative power; and wrapping around the at least one coefficient raised to the negative power as the at least one top coefficient of the polynomial.

Example J, the method of Example I, wherein the wrapping around the at least one coefficient further includes negating the at least one top coefficient of the polynomial.

Example K, the method of any one of Examples D through J, further comprising: determining that the real number can be approximated as an approximate real number; and determining a fractional base to encode the polynomial, the fractional base based at least partly on the approximate real number.

Example L, the method of any one of Examples D through K, further comprising applying a slot encoding to the polynomial to generate a slot-encoded polynomial to increase a number of homomorphic operations that can be performed on the slot-encoded polynomial.

Example M, the method of any one of Examples D through L, further comprising receiving at least one encoding parameter via a network from a server, wherein the encoding the integer portion and the fractional portion is based at least in part on the at least one encoding parameter.

While Example D through Example M are described above with respect to a method, it is understood in the context of this document that the content of Example D through Example M may also be implemented via a device, system, and/or computer storage media.

Example N, a system comprising: one or more processors; and memory storing modules that, when executed by the one or more processors, cause the system to perform operations comprising: receiving a data set including a real number, the real number including an integer portion and a fractional portion; encoding the integer portion and the fractional portion in a polynomial, the fractional portion of the real number represented as at least one top coefficient of the polynomial, wherein the at least one top coefficient is determined by a length of the polynomial determined for at least one homomorphic operation; encrypting the polynomial as a ciphertext; transmitting the ciphertext via a network to a server; and receiving, from the server, a result of a performance of the at least one homomorphic operation on the ciphertext.

Example O, the system of Example N, wherein the real number is encoded in the polynomial as a single polynomial without converting the real number to an integer.

Example P, the system of Example N or Example O, wherein the encoding the integer portion and the fractional portion in the polynomial reduces a processing time of the one or more processors when performing at least one homomorphic operation.

Example Q, the system of any one of Examples N through P, wherein the at least one homomorphic operation includes at least one of addition, subtraction, multiplication, or division.

Example R, the system of any one of Examples N through Q, wherein the operations further comprise: generating an expanded polynomial representing the real number using base two, the expanded polynomial including at least one coefficient raised to a negative power; and wrapping around the at least one coefficient raised to the negative power as the at least one top coefficient of the polynomial.

Example S, the system of Example R, wherein the wrapping around the at least one coefficient further includes negating the at least one top coefficient of the polynomial.

Example T, the system of any one of Examples N through S, further comprising: determining that the real number can be approximated as an approximate real number; and determining a fractional base to encode the polynomial, the fractional base based at least partly on the approximate real number.

While Example N through Example T are described above with respect to a system, it is understood in the context of this document that the content of Example N through Example T may also be implemented via a device, computer storage media, and/or a method.

CONCLUSION

Although the present disclosure can use language that is specific to structural features and/or methodological operations, the disclosure is not limited to the specific features or operations described herein. Rather, the specific features and operations are disclosed as illustrative forms of implementing the disclosure.

What is claimed is:

1. A computing device comprising:
   one or more hardware processors; and
   memory storing modules that, when executed by the one or more hardware processors, cause the computing device to perform operations comprising:
   receiving a data set including a real number, the real number including an integer portion and a fractional portion; and
   encoding the integer portion and the fractional portion in a polynomial, the encoding comprising:
   encoding the fractional portion of the real number by setting, for each coefficient of a term of the polynomial with a negative exponent, e, a coefficient of a term of the polynomial with an exponent equal to n+e to the coefficient of the term of the polynomial with the negative exponent, removing all terms with a negative exponent, and keeping the remaining coefficients of all other terms of the polynomial the same, where n is the size of the polynomial; and
   encrypting the polynomial as ciphertext; and
   transmitting the ciphertext via a network to a server.

2. A computer-implemented method for performing encoding for homomorphic encryption by at least one hardware processor, the method comprising:
   receiving, by the hardware processor, a data set including a real number, the real number including an integer portion and a fractional portion; and
   encoding, by the hardware processor, the integer portion and the fractional portion in a polynomial, the encoding comprising:
   encoding, by the hardware processor, the fractional portion of the real number by setting, for each coefficient of a term of the polynomial with a negative exponent, e, a coefficient of a term of the polynomial with an exponent equal to n+e to the coefficient of the term of the polynomial with the negative exponent, removing all terms with a negative exponent, and keeping the remaining coefficients of all other terms of the polynomial the same, where n is the size of the polynomial; and
   encrypting the polynomial as ciphertext; and
   transmitting the ciphertext via a network to a server.

3. The method of claim 2, further comprising:
   receiving, from the server, a result of a performance of the at least one homomorphic operation on the ciphertext.

4. The method of claim 2, wherein the at least one homomorphic operation includes at least one of addition, subtraction, multiplication, or division.

5. The method of claim 2, further comprising:
   determining that the real number can be approximated as an approximate real number; and
   determining a fractional base to encode the polynomial, the fractional base based at least partly on the approximate real number.

6. The method of claim 2, further comprising applying a slot encoding to the polynomial to generate a slot-encoded polynomial to increase a number of homomorphic operations that can be performed on the slot-encoded polynomial.

7. The method of claim 2, further comprising receiving at least one encoding parameter via a network from a server, wherein the encoding the integer portion and the fractional portion is based at least in part on the at least one encoding parameter.

8. A system comprising:
   one or more hardware processors; and
   memory storing modules that, when executed by the one or more hardware processors, cause the system to perform operations comprising:
   receiving a data set including a real number, the real umber including an integer portion and a fractional portion;
   encoding the integer portion and the fractional portion in a polynomial, the encoding comprising:
   encoding the fractional portion of the real number by setting, for each coefficient of a term of the polynomial with a negative exponent, e, a coefficient of a term of the polynomial with an exponent equal to n+e to the coefficient of the term of the polynomial with the negative exponent, removing all terms with a negative exponent and keeping the remaining coefficients of all other terms of the polynomial the same, where n is the size of the polynomial; and encrypting the polynomial as a ciphertext;

transmitting the ciphertext via a network to a server; and receiving, from the server, a result of a performance of the at least one homomorphic operation on the ciphertext.

9. The system of claim 8, wherein the real number is encoded in the polynomial as a single polynomial without converting the real number to an integer.

10. The system of claim 8, wherein the at least one homomorphic operation includes at least one of addition, subtraction, multiplication, or division.

11. The system of claim 8, further comprising:

determining that the real number can be approximated as an approximate real number; and determining a fractional base to encode the polynomial, the fractional base based at least partly on the approximate real number.

* * * * *